US012223325B2

(12) United States Patent
Croxford et al.

(10) Patent No.: US 12,223,325 B2
(45) Date of Patent: Feb. 11, 2025

(54) APPARATUS AND METHOD OF OPTIMIZING DIVERGENT PROCESSING IN THREAD GROUPS PRELIMINARY CLASS

(71) Applicant: Arm Limited, Cambridge (GB)

(72) Inventors: Daren Croxford, Swaffham Prior (GB); Isidoros Sideris, Cambridge (GB)

(73) Assignee: Arm Limited, Cambridge (GB)

( * ) Notice: Subject to any disclaimer, the term of this patent is extended or adjusted under 35 U.S.C. 154(b) by 64 days.

(21) Appl. No.: 18/357,503

(22) Filed: Jul. 24, 2023

(65) Prior Publication Data

US 2024/0036874 A1 Feb. 1, 2024

(30) Foreign Application Priority Data

Jul. 29, 2022 (EP) .................................. 22386053

(51) Int. Cl.
*G06F 9/30* (2018.01)
*G06F 9/38* (2018.01)

(52) U.S. Cl.
CPC .......... *G06F 9/3851* (2013.01); *G06F 9/3867* (2013.01)

(58) Field of Classification Search
None
See application file for complete search history.

(56) References Cited

U.S. PATENT DOCUMENTS

| 10,282,331 | B1 * | 5/2019 | Asturias | G06F 9/00 |
| 10,922,086 | B2 * | 2/2021 | Petit | G06F 9/30181 |
| 11,016,774 | B1 * | 5/2021 | Dejanovic | G06F 9/3887 |
| 12,112,533 | B2 * | 10/2024 | Chen | G06N 3/063 |
| 2001/0042187 | A1 * | 11/2001 | Tremblay | G06F 9/3838 712/E9.046 |
| 2013/0262831 | A1 | 10/2013 | Nelson et al. | |
| 2015/0089202 | A1 * | 3/2015 | Qiu | G06F 9/3851 712/218 |
| 2016/0132338 | A1 | 5/2016 | Jin | |
| 2017/0185406 | A1 | 6/2017 | Lu et al. | |
| 2018/0143829 | A1 * | 5/2018 | Lowell | G06F 9/4843 |
| 2018/0293100 | A1 * | 10/2018 | Mukherjee | G06F 9/4881 |
| 2019/0102859 | A1 * | 4/2019 | Hux | G06T 1/20 |
| 2019/0294439 | A1 * | 9/2019 | Ostby | G06F 9/3851 |

(Continued)

OTHER PUBLICATIONS

Combined Search and Examination Report dated Mar. 20, 2023, GB Patent Application No. GB2213155.1.

*Primary Examiner* — Hyun Nam
(74) *Attorney, Agent, or Firm* — Pearl Cohen Zedek Latzer Baratz LLP

(57) ABSTRACT

A data processor is disclosed in which groups of execution threads comprising a thread group can execute a set of instructions in lockstep, and in which a plurality of execution lanes can perform processing operations for the execution threads. In response to an execution thread issuing circuit determining whether a portion of active threads of a first thread group and a portion of active threads of a second thread group use different execution lanes of the plurality of execution lanes, the execution thread issuing circuit issuing both the portion of active threads of a first thread group and a portion of active threads of a second thread group for execution. This can have the effect of increasing data processor efficiency, thereby increasing throughput and reducing latency.

18 Claims, 15 Drawing Sheets

(56) References Cited

U.S. PATENT DOCUMENTS

| | | | |
|---|---|---|---|
| 2020/0192676 A1* | 6/2020 | Pearce | G06F 9/3836 |
| 2022/0391216 A1* | 12/2022 | Bruce | G06T 1/20 |
| 2024/0036874 A1* | 2/2024 | Croxford | G06F 9/3887 |
| 2024/0378041 A1* | 11/2024 | Berson | G06F 8/71 |

* cited by examiner

APPARATUS AND METHOD OF OPTIMIZING DIVERGENT PROCESSING IN THREAD GROUPS PRELIMINARY CLASS

BACKGROUND

The technology described herein relates generally to the operation of data processing systems, and in particular to graphics processing systems that include one or more programmable processing stages ("shaders").

Graphics processing is typically carried out in a pipelined fashion, with one or more pipeline stages operating on the data to generate the final render output, e.g. a frame that is displayed. Many graphics processing pipelines now include one or more programmable processing stages, commonly referred to as "shaders". For example, a graphics processing pipeline may include one or more of, and typically all of: a geometry shader, a vertex shader, and a fragment (pixel) shader. These shaders are programmable processing stages that execute shader programs on input data values to generate a desired set of output data, for example appropriately shaded and rendered fragment data in the case of a fragment shader, for processing by the rest of the graphics processing pipeline and/or for output (e.g. as the final render output). The shaders of the graphics processing pipeline may share programmable processing circuit(s), or they may each be executed by distinct programmable processing units.

A graphics processing unit (GPU) shader core is thus a processing unit that performs graphics processing by running relatively small programs for each graphics work item in a graphics output, such as a render target, e.g. frame, to be generated (an item in this regard is usually a vertex (e.g. in the case of a vertex shader) or a sampling position (e.g. in the case of a fragment shader)). This generally enables a high degree of parallelism, in that a typical render output, e.g. frame, features a rather large number of vertices and fragments, each of which can be processed independently. This high degree of parallelism makes the graphics processing unit particularly efficient at performing other processing tasks, such as Machine Learning (ML), and general compute.

In graphics shader operation, each work item will be processed by means of an execution thread which will execute the instructions of the shader program in question for the graphics work item in question.

The actual data processing operations that are performed by the shader program will be performed by an instruction execution processing circuit which comprises respective functional units, such as arithmetic units, of the graphics processing unit, in response to, and under the control of, the instructions in the shader program being executed. Thus, for example, appropriate functional units, such as arithmetic units, will perform data processing operations in response to and as required by instructions in a shader program being executed. Typically, the instruction execution processing circuit comprises a plurality of execution lanes provided in a graphics processing unit (GPU), each execution lane of which can be respectively and appropriately activated and used for an execution thread when executing a shader program.

The functional units provided in a graphics processing unit for the purpose of performing operations required by shader programs (and otherwise) may be (and are typically) shared between different shaders (shader stages) of the graphics processing pipeline being executed by the graphics processing unit. Thus, there will typically be a set of functional units arranged for, and usable for, the execution of shader programs. It would also be possible to provide separate functional units for separate shaders (or for some functional units to be separate and for some to be shared), as desired.

Shader program execution efficiency may be improved by grouping execution threads (where each thread corresponds, e.g., to one vertex or one sampling position) into "groups" or "bundles" of threads, where the threads of one group are run in lockstep, one instruction at a time, with each thread typically processing different data. The thread processing circuit is referred to as adopting a Single Instruction Multiple Thread (SIMT) execution model. In this way, it is possible to share instruction fetch and scheduling resources between all the threads in the group. Other terms used for such thread groups include, "warps" and "wave fronts". For convenience, the term "thread group" will be used herein, but this is intended to encompass all equivalent terms and arrangements, unless otherwise indicated. The instructions that each of the threads within the thread group are to execute can be fetched in dependence upon a common program counter shared between the threads.

Data processing operations performed by a thread in a thread group may diverge from data processing operations performed by other threads in the thread group. This divergent processing may occur in a variety of ways.

Divergent processing may occur when a subset of threads of a thread group executes a branch instruction, while the other portion of threads in the thread group do not. In SIMT systems, it is known to provide a mechanism to detect any such divergence, and then to allow subsequent processing of the threads to be restricted to a particular subset of the threads until such a point is reached where the threads are detected to reconverge. Processing the subset of the threads until such a point is reached where the threads are detected to reconverge results in only the portion of execution lanes associated with the subset of threads being active, thereby, reducing efficiency.

Alternatively, divergent processing may occur when a subset of threads of a thread group executes a predicated instruction (an instruction where a thread is only executed if the thread meets a condition specified in the instruction). Threads that do not meet the condition specified in the instruction are not executed. Processing a subset of the "active" threads of the thread group results only the portion of execution lanes being used, thereby, reducing efficiency.

Divergent processing in graphics processing, is often due to "if else" clauses, where a subset of the threads of a thread group that meet a condition execute a first data processing operation and the other threads of the thread group perform a second data processing operation. In graphics processing, where shader programs, are often relatively short, optimising divergent processing, may result in significant efficiency and throughput improvements.

Accordingly, it would be desirable to provide an improved mechanism for optimizing divergent processing within such a data processing system.

BRIEF DESCRIPTION OF THE DRAWINGS

The technology described herein will be described further, by way of example only, with reference to embodiments thereof as illustrated in the accompanying drawings, in which.

Like reference numerals are used for like components where appropriate in the drawings.

DETAILED DESCRIPTION

Figure 1:
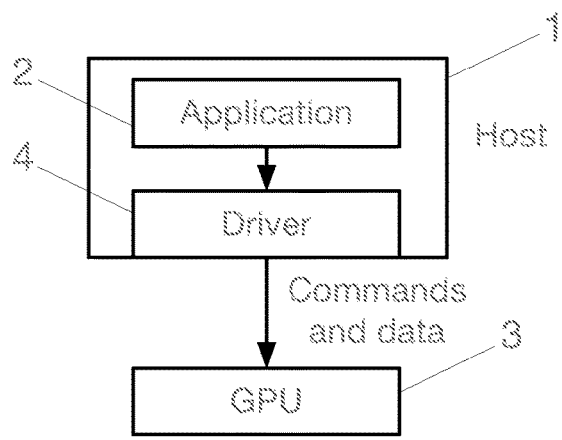
FIG. 1 shows an exemplary graphics processing system.

A first embodiment of the technology described herein comprises a method of operating a data processor in which execution threads may execute program instructions to perform data processing operations on data values, and in which execution threads may be grouped together into thread groups in which the plural execution threads of a thread group can each execute a set of instructions in lockstep;

the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups to the plurality of execution lanes of the instruction execution processing circuit for execution;

the method comprising:
determining, using the execution thread issuing circuit, whether active threads to be executed of a first thread group to perform a first operation and active threads to be executed of a second thread group to perform a second operation use different execution lanes of the plurality of execution lanes of the instruction execution processing circuit for execution in a processing cycle; and issuing active threads from both first and second thread groups for execution across the different execution lanes in the processing cycle when the active threads to be executed of the first thread group and active threads to be executed of the second thread group use different execution lanes of the plurality of execution lanes of the instruction execution processing circuit for execution.

A second embodiment of the technology described herein comprises a data processor apparatus in which execution threads may execute program instructions to perform data processing operations on data values, and in which execution threads may be grouped together into thread groups in which the plural execution threads of a thread group can each execute a set of instructions in lockstep;

the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups to the plurality of execution lanes of the instruction execution processing circuit for execution;

wherein the execution thread issuing circuit is configured to determine whether active threads to be executed of a first thread group to perform a first operation and active threads to be executed of a second thread group to perform a second operation use different execution lanes of the plurality of execution lanes of the instruction execution processing circuit for execution in a processing cycle; and the execution thread issuing circuit is configured to issue active threads from both first and second thread groups for execution across the different execution lanes in the processing cycle when the active threads to be executed of the first thread group and active threads to be executed of the second thread group use different execution lanes of the plurality of execution lanes of the instruction execution processing circuit for execution.

A further embodiment comprises a non-transitory computer readable storage medium storing software code which when executing on a data processor performs a method of operating a data processor in which execution threads may execute program instructions to perform data processing operations on data values, and in which execution threads may be grouped together into thread groups in which the plural execution threads of a thread group can each execute a set of instructions in lockstep;

the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups to the plurality of execution lanes of the instruction execution processing circuit for execution;

the method comprising:
determining, using the execution thread issuing circuit, whether active threads to be executed of a first thread group to perform a first operation and active threads to be executed of a second thread group to perform a second operation use different execution lanes of the plurality of execution lanes of the instruction execution processing circuit for execution in a processing cycle; and the execution thread issuing circuit is configured to issue active threads from both first and second thread groups for execution across the different execution lanes in the processing cycle when the active threads to be executed of the first thread group and active threads to be executed of the second thread group use different execution lanes of the plurality of execution lanes of the instruction execution processing circuit for execution.

The technology described herein relates to data processors, such as a graphics processing unit, which can execute execution threads to execute a set of instructions for a program to perform data processing operations on data values, and in which threads that are to execute the instructions of a program may be grouped together into thread groups ("warps"), with the execution threads of a thread group ("warp") executing instructions of a program in lockstep, e.g. such that each execution thread within a thread group ("warp") executes the same instruction (to perform a processing operation) in the program before the next instruction in the program is executed (and so on). The data processor (e.g. graphics processing unit) includes an instruction execution processing circuit which is configured as a plurality of execution lanes, and an execution thread issuing circuit which issues execution threads of thread groups to the execution lanes for execution.

In the technology described herein, active execution threads to be executed for plural thread groups using different execution lanes of the instruction execution processing circuit are issued to the instruction execution processing circuit for execution.

Active threads are threads in a thread group where an operation defined by an instruction is performed. Where the instruction is predicated, a thread will be an active thread if the condition specified by the predicated instruction to perform an operation for that thread is met, and thereby the operation is performed on the thread. Where, a conditional or indirect branch instruction is executed, a subset of the threads of the thread group may take the branch and execute the associated taken branch instructions, another subset of threads of the thread group may not take the branch and will therefore execute the associated non-taken branch instructions. Active threads of the thread group in this scenario are the threads that perform an operation for the appropriate instruction path.

There may be multiple conditional or indirect branch instructions and therefore there may be multiple (nested) instruction paths. An instruction path may itself contain predicated instructions.

As will be discussed further below, by issuing plural active threads to be executed for plural thread groups, the instruction execution processing circuit is able to execute a plurality of thread groups across the different execution lanes in a processing cycle. A processing cycle maybe one or more clock cycles.

The Applicant has also recognised that typically a subset of execution lanes of the instruction execution processing circuit is active during divergent processing. The Applicant has also realised that "if else" clauses, are common in divergent processing. Thereby the active execution lanes in a first instruction sequence (where an instruction sequence, is a sequence of instructions) will be inactive in a second instruction sequence. Therefore, the active execution lanes of a first instruction sequence and a second instruction sequence are mutually exclusive. Such as sequence of instructions where a first sequence of instructions and a second sequence of instruction use mutually exclusive active executions lanes, is known as a divergent instruction sequences.

The Applicant has also recognised that the execution lane circuit is relatively large, compared to the size of the instruction fetch and instruction decode circuit. Therefore, inactive execution lanes are particularly inefficient.

The Applicant has also realised that in a deep warp functional unit arrangement the instruction fetch, and instruction decode circuits are underutilised, and therefore in some embodiments, these units can be used for fetching and decoding a plurality of divergent instruction streams whilst the instruction execution processing circuit is executing an instruction.

The Applicant believe there remains scope for providing an improved graphics processing system, where the divergent processing may be executed simultaneously, or mostly simultaneously on the provided execution lanes, thereby increasing throughput, and reducing latency without significantly increasing complexity or silicon area.

Thus, the technology described herein particularly relates to an apparatus and method for optimising divergent processing in thread groups, where each thread group comprises multiple threads.

For example, where a plurality of thread groups from divergent processing are determined by the execution thread issuing circuit to use different resources and different execution lanes in the instruction execution processing circuit, then the execution thread issuing circuit issues the plurality of thread groups across the different execution lanes for execution by the instruction execution processing circuit.

Thus, by issuing plural thread groups ("warp") to the instruction execution processing circuit, where each thread group uses different execution lanes of the plurality of execution lanes, the execution lane utilisation of the plurality of execution lanes is increased e.g., as compared to issuing each thread group separately, one after the other.

The technology described herein can accordingly increase the throughput and reduce the latency, when executing programs. This is generally advantageous but may be particularly advantageous in contexts of graphics processing, where "if else" clauses are relatively common, and graphics processing shader programs are often relatively short.

It will be appreciated, therefore, that the technology described herein provides an improved data processor.

The thread group ("warp") that the execution thread issuing circuit issues threads from can be any suitable group of plural execution threads (that each execute a set of instructions in lockstep).

The thread group can be any suitable and desired size. In an embodiment, there is a fixed thread group size that the data processor supports. The number of threads within the thread group is, in an exemplary embodiment, a power of two. For example, the thread groups may contain, e.g., four threads (i.e. there is a "warp width" of four), or wider thread groups (warps) would be possible, such as eight or sixteen threads.

The technology described herein is particularly advantageous where the number of threads in a plurality of thread group is larger than the number of execution lanes in the instruction execution processing circuit.

As an example, the following code fragment, written in a high level shader programming language, contains a divergent processing, "if else" clause. The code fragment tests whether the current fragment position is within a render area (defined by render_area_min_x, render_area_max_x, render_area_min_y, render_area_max_y), if so, a clear colour is assigned to the fragment colour (fragColor0=clear_color0), else (otherwise) a texture fetch (fragColor0=texelFetch (sampler0, gl_FragPosition, 0) is assigned.

```
if ((gl_FragPosition.x >= render_area_min_x) &&
    (gl_FragPosition.x <= render_area_max_x) &&
    (gl_FragPosition.y >= render_area_min_y) &&
    (gl_FragPosition.y <= render_area_max_y))
{
  fragColor0 = clear_color0;
} else
{
  fragColor0 = texelFetch(sampler0, gl_FragPosition, 0);
}
```

The code fragment is part of a small (fragment) shader program, that is executed a plurality of times. A fragment shader may be executed once for each fragment in a rendered image. As an example, when rendering a 4K resolution frame (without super sampling), the fragment shader program will be executed 3840×2160=8,294,400 times when rendering the frame.

Each thread in a thread group of a fragment shader program has a different fragment position. A thread of the thread group may lie inside the render area and therefore the fragment colour will be assigned to the clear colour, else the fragment colour is dependent on the result of the texture fetch.

The shader program is provided by the application to the driver, which then compiles the shader program to binary code for the graphics processing pipeline.

Depending upon the instruction set of the graphics processing pipeline, and the compiler the above code fragment may be compiled into a number of different instruction sequences. In a first instruction sequence a conditional or indirect branch instruction is used to select whether the fragment colour to be assigned is the clear colour, or the result of the texture fetch. In a second instruction sequence predicated instructions may be used to select the fragment colour. In a third instruction sequence a predicated instruction may specify a plurality of operations, to select the fragment colour.

An example first instruction sequence, where the compiler inserts a conditional branch and/or indirect branch instruction shown below.

1 CMP #gl_FragPosition.x, #render_area_min_x
 2 B.LT label1
 3 CMP #gl_FragPosition.x, #render_area_max_x
 4 B.GT label1
 CMP #gl_FragPosition.y, #render_area_min_y
 6 B.LT label1
 7 CMP #gl_FragPosition.y, #render_area_max_y
 8 B.GT label1
 9 MOV R0, #clear_color0
 B label2
 11 label1: VAR_TEX R0
 12 label2:

In detail, instructions 1 to 8 perform a test to determine whether the current fragment position is within the render area.

Instruction 1 in this sequence, is a compare instruction, CMP, which performs a comparison of the input operands, gl_FragPosition.x and render_area_min_x. The result of the compare instruction sets the flags.

Instruction 2 is a branch instruction, B, which branches if the less than, LT, flag is set. If gl_FragPosition.x is less than render_area_min_x the branch instruction branches to label1, otherwise the next instruction is executed.

Instruction 3 compares gl_FragPosition.x and render_area_max_x.

Instruction 4 is a branch instruction, B, which branches if the greater-than, GT, flag is set.

Instruction 5 compares gl_FragPosition.y and render_area_min_y.

Instruction 6 is a branch instruction, B, which branches if the less than, LT, flag is set.

Instruction 7 compares gl_FragPosition.y and render_area_max_y.

Instruction 8 is a branch instruction, B, which branches if the greater than, GT, flag is set.

Instruction 9 is executed if the current fragment position is within the render area. Instruction 9 is a move, MOV, instruction, where the value of the clear_color0 is written into register R0.

Instruction 10 is a branch instruction which branches to label2, thereby branching over (skipping) instruction 11.

Instruction 11 is executed if the current fragment position is outside the render area, and a texture fetch is performed. The varying texture lookup instruction, VAR_TEX, performs a varying texture lookup and the result is written into register R0.

If the branch instruction, on lines 2, 4, 6 or 8 are taken, the texture fetch is performed (VAR_TEX R0). If none of the branch instructions are taken the clear colour is assigned (MOV R0, #clear_color0).

Branch instructions are relatively energy intensive and inefficient. The above instruction sequence, where the compiler inserts a conditional branch and/or indirect branch instruction, can be implemented with fewer branch instructions, as can be seen in the code sequence below.

Instructions 1 to 8 perform a test to determine whether the current fragment position is within the render area.

The conditional branch instruction, see line 9, is used to select between the clear colour output, or the texture fetch operation.

1 CMP #gl_FragPosition.x, #render_area_min_x
 2 CSEL R0, #1, #0, GE
 3 CMP #gl_FragPosition.x, #render_area_max_x
 4 CSEL R0, R0, #0, LE
 CMP #gl_FragPosition.y, #render_area_min_y
 6 CSEL R0, R0, #0, GE
 7 CMP #gl_FragPosition.y, #render_area_max_y
 8 CSEL R0, R0, #0, LE
 9 B.EQ label1
 MOV R0, #clear_color0
 11 B label2
 12 label1: VAR_TEX R0
 13 label2:

In detail, instruction 1 in this sequence, is a compare instruction, CMP, which performs a comparison of the input operands, gl_FragPosition.x and render_area_min_x. The result of the compare instruction sets the flags.

Instruction 2 is a conditional select instruction. If the condition, greater-than-or-equal-to (GE) flag is set, the value 1 is written to the destination register R0, otherwise the value 0 is written to the register.

Instruction 3 compares gl_FragPosition.x and render_area_max_x.

Instruction 4 is a conditional select instruction. If the condition, less-than-or-equal-to (LE) flag is set, the value in the register R0 is written to the destination register R0, otherwise the value 0 is written into the destination register R0.

Instruction 5 compares gl_FragPosition.y and render_area_min_y.

Instruction 6 is a conditional select instruction. If the condition, greater-than-or-equal-to (GE) flag is set, the value in the register R0 is written to the destination register R0, otherwise value 0 is written into the destination register R0.

Instruction 7 compares gl_FragPosition.y and render_area_max_y.

Instruction 8 is a conditional select instruction. If the condition, greater-than-or-equal-to (GE) flag is set, the value in the register R0 is written to the destination register R0, otherwise the value 0 is written into the destination register R0.

Instruction 9 is a branch instruction, B, which branches to label1 if the equal-to, EQ, flag is set.

Instruction 10 is executed if the current fragment position is within the render area. Instruction 10 is a move, MOV, instruction, where the value of the clear_color0 is written into register R0.

Instruction 11 is a branch instruction which branches to label2, thereby skipping instruction 12.

Instruction 12 is executed if the current fragment position is outside the render area, and a texture fetch is performed. The varying texture lookup instruction, VAR_TEX, performs a varying texture lookup and the result is written into register R0.

Each instruction in the instruction sequence specifies an operation. Each instruction operates on a thread group.

In an embodiment, the branch instruction on line 9 is executed. Instruction fetch, and instruction decode circuits decode both the taken (instruction 12) and non-taken instruction paths (instruction 10). The execution thread issuing circuit determines whether the active threads to be executed of the thread group of the taken instruction path and the active threads to be executed of the thread group of the non-taken instruction path use different resources, and different execution lanes of the instruction execution processing circuit 47. If so, the execution thread issuing circuit 45 issues the instruction from both taken and non-taken instruction path in a clock cycle.

In a second instruction sequence predicated instructions may be used to select the fragment colour.

The example instruction sequence has the same test instructions, instructions 1 to 8 as for the above instruction sequence. However, this sequence uses predicated instructions to select the fragment colour rather than a conditional branch instruction.

1 CMP #gl_FragPosition.x, #render_area_min_x
2 CSEL R0, #1, #0, GE
3 CMP #gl_FragPosition.x, #render_area_max_x
4 CSEL R0, R0, #0, LE
5 CMP #gl_FragPosition.y, #render_area_min_y
6 CSEL R0, R0, #0, GE
7 CMP #gl_FragPosition.y, #render_area_max_y
8 CSEL R0, R0, #0, LE
9 MOV.NE R0, #clear_color0
10 VAR_TEX.EQ R0

In detail, instruction 1 in this sequence, is a compare instruction, CMP, which performs a comparison of the input operands, gl_FragPosition.x and render_area_min_x. The result of the compare instruction sets the flags.

Instruction 2 is a conditional select instruction. If the condition, greater-than-or-equal-to (GE) flag is set, the value 1 is written to the destination register R0, otherwise the value 0 is written to the register.

Instruction 3 compares gl_FragPosition.x and render_area_max_x.

Instruction 4 is a conditional select instruction. If the condition, less-than-or-equal-to (LE) flag is set, the value in register R0 is written to the destination register R0, otherwise the value 0 is written into the destination register R0.

Instruction 5 compares gl_FragPosition.y and render_area_min_y.

Instruction 6 is a conditional select instruction. If the condition, greater-than-or-equal-to (GE) flag is set, the value in register R0 is written to the destination register R0, otherwise the value 0 is written into the destination register R0.

Instruction 7 compares gl_FragPosition.y and render_area_max_y.

Instruction 8 is a conditional select instruction. If the condition, greater-than-or-equal-to (GE) flag is set, the value in register R0 is written to the destination register R0, otherwise the value 0 is written into the destination register R0.

Instruction 9 is executed if the current fragment position is within the render area. Instruction 9 is a predicated move instruction, MOV. The move instruction is executed if the condition, not-equal-to (NE) flag is set. If the condition code passes the value of the clear_color0 is written into register R0.

Instruction 10 is executed if the current fragment position is outside the render area, and a texture fetch is performed. Instruction 10 is a predicated varying texture lookup instruction, VAR_TEX. The varying texture lookup instruction is executed if the condition, equal-to (EQ) flag is set. If the condition code passes, a varying texture lookup is performed, and the result is written into register R0.

The predicated move instruction (instruction 9) is decoded by the instruction decode circuit. In an embodiment, the compiler may set a hint field, in the instruction op-code (instruction 9), indicating that the instruction being decoded (instruction 9) and the subsequent instruction (instruction 10) may be executed in the same clock cycle. In an alternative embodiment, the instruction decode circuit may determine that the instruction (instruction 9) is a predicated instruction, and to in an embodiment decode the following instruction. The instruction decode circuit may then decode the subsequent instruction (instruction 10). Both instruction 9 and instruction 10 specify an operation.

Both instruction 9 and instruction 10 specify predicates, where the predicate specified by instruction 9 is different to the predicate specified in instruction 10. The execution thread issuing circuit 45 determines whether the active threads to be executed of the thread group of the first instruction (instruction 9) and the active threads to be executed of the thread group of the second instruction (instruction 10) use different resources, and different execution lanes of the instruction execution processing circuit 47. If so, the execution thread issuing circuit 45 issues the instruction from both taken and non-taken instruction path in a clock cycle.

In a third instruction sequence a predicated instruction may specify a plurality of operations to specify the fragment colour.

The example instruction sequence has the same test instructions, instructions 1 to 8 as for the above instruction sequence. However, this sequence uses a predicated instructions to specify a plurality of operations to select the fragment colour.

1 CMP #gl_FragPosition.x, #render_area_min_x
2 CSEL R0, #1, #0, GE
3 CMP #gl_FragPosition.x, #render_area_max_x
4 CSEL R0, R0, #0, LE CMP #gl_FragPosition.y, #render_area_min_y
6 CSEL R0, R0, #0, GE
7 CMP #gl_FragPosition.y, #render_area_max_y
8 CSEL R0, R0, #0, LE
9 VAR_TEX.NE MOV.EQ R0, #clear_color0

In detail, instruction 1 in this sequence, is a compare instruction, CMP, which performs a comparison of the input operands, gl_FragPosition.x and render_area_min_x. The result of the compare instruction sets the flags.

Instruction 2 is a conditional select instruction. If the condition, greater-than-or-equal-to (GE) flag is set, the value 1 is written to the destination register R0, otherwise the value 0 is written to the register.

Instruction 3 compares gl_FragPosition.x and render_area_max_x.

Instruction 4 is a conditional select instruction. If the condition, less-than-or-equal-to (LE) flag is set, the value in the register R0 is written to the destination register R0, otherwise the value 0 is written into the destination register R0.

Instruction 5 compares gl_FragPosition.y and render_area_min_y.

Instruction 6 is a conditional select instruction. If the condition, greater-than-or-equal-to (GE) flag is set, the value in the register R0 is written to the destination register R0, otherwise the value 0 is written into the destination register R0.

Instruction 7 compares gl_FragPosition.y and render_area_max_y.

Instruction 8 is a conditional select instruction. If the condition, greater-than-or-equal-to (GE) flag is set, the value in the register R0 is written to the destination register R0, otherwise the value 0 is written into the destination register R0.

Instruction 9 is a predicated instruction which defines two operations. If the not-equal (NE) condition is met (if the current fragment position is outside the render area) a varying texture lookup operation is performed, if the equal-to (EQ) condition is met the value of clear_color0 is written into register R0.

In an embodiment, a predicated instruction supports a plurality of operations. The operation selected and performed is dependent on the condition specified by the predicated instruction. The op-code may indicate a single predicate and two operations. If the condition specified by the predicate is met the first operation is performed, otherwise the second operation is performed. In an alternate embodiment, the instruction may encode a predicate for each operation. Therefore, if the condition specified by the first predicate is met the first operation is performed and if the condition specified by the second predicate is met the second operation is performed. An instruction may specify a plurality of predicates and a plurality of operations. The predicates specified by the instruction will in an embodiment be mutually exclusive. However, if there are multiple predicates specified by the instruction that are met, only the first of the plurality of operations that meets the condition code is performed.

Upon the data processor fetching and decoding the instruction (instruction 9), the execution thread issuing circuit determines whether the execution lanes used for the taken and non-taken paths are mutually exclusive. In addition, the execution thread issuing circuit determines if there is any resource contention if both operations specified by the instruction (instruction 9) are executed substantially simultaneously, in a clock cycle. If the execution lanes used for both paths are not mutually exclusive or there is resource contention if both paths are executed substantially simultaneously in a clock cycle, the two paths are executed sequentially. Otherwise, if the execution lanes used for both paths are mutually exclusive and there is no resource contention, both paths are executed substantially simultaneously in a clock cycle.

An (processing stage of an) execution lane can perform a processing operation for an execution thread that has been issued to it for execution in any suitable and desired manner. The processing operation can be any suitable and desired operation, and can be carried out in any suitable and desired manner.

In an embodiment, an execution lane is provided by one or more functional units operable to perform data processing operations for an instruction being executed by an execution thread. Each functional unit should be, and in an embodiment is, able to process as many threads in parallel as there are execution lanes (so each functional unit will comprise a set of plural execution lanes).

Depending on the processing required, a given thread (group) could be processed by a single functional unit (processing stage) only, or by a plurality of functional units (processing stages). Thus, each execution lane could comprise overall only a single functional unit, or could comprise plural functional units (and in an embodiment this is the case). Each execution lane should, and in an embodiment does, comprise overall the same functional unit or units as the other execution lanes (so that each execution lane can operate in the same manner in respect of a thread).

Where an execution lane comprises plural functional units (processing stages), then the plural functional units may be arranged in series (e.g. pipeline), with each functional unit performing its respective data processing operation for an execution thread in turn. In the case where plural execution threads are issued to an execution lane comprising plural functional units arranged in series (a pipeline), then the plural execution threads may be processed in a pipelined manner, e.g. such that different functional units (processing stages) can be performing their respective operations for different execution threads (issued to the same execution lane) at the same time, and such that a new input thread to the pipeline can be accepted before processing of the previous input thread has been completed.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processing unit), store-type units (such as blend or store units), etc. In an embodiment, the functional units (at least) comprise arithmetic units (i.e. units operable to perform arithmetic (mathematical) operations).

The functional units can be implemented as desired and in any suitable manner. They will comprise (be implemented as) suitable hardware elements such as processing circuits (logic).

The data processor comprises appropriate control circuit(s) (control logic) for controlling the execution lanes (the functional units operating as the execution lanes) to cause them to perform the desired and appropriate processing operations.

This can be done using any suitable and desired control circuit(s). The control circuit(s) comprises instruction fetch circuit(s), instruction decode circuit(s) that are operable to fetch and decode an instruction to be executed for a thread. The execution thread issuing circuit is operable so as to cause the execution lane to execute the required decoded instructions.

Such instruction fetch and decode circuits are in an embodiment provided for all the execution lanes collectively (i.e. such that there is in an embodiment one instruction fetch circuit and one instruction decode circuit that are operable to fetch and decode an instruction that is then to be executed by all of the execution lanes). In this case, all the execution lanes in an embodiment execute the same instruction (at any one time (in a given cycle)).

Thus, in an embodiment, a single instruction decode circuit is provided that is operable to decode an instruction for all of the execution lanes collectively, such that all the execution lanes will execute the same instruction at any one time (in a given cycle). This can then ensure that the threads of the thread group ("warp") are run in lockstep, one instruction at a time.

The single instruction decode circuit may be operable decode a further instruction whilst the current instruction is being issued by execution thread issuing circuit or the current instruction is executed by the instruction execution processing circuit.

In an alternative embodiment, there may be a plurality of instruction decode to decode a plurality of instruction in a clock cycle.

Therefore, the execution thread issuing circuit may receive a plurality of decoded instructions and/or operations from the instruction decode circuit. The execution thread issuing circuit operable to determine whether active threads to be executed of a plurality of thread group to perform associated plurality of operation use different resources and different execution lanes of the plurality of execution lanes of the instruction execution processing circuit. Where the execution thread issuing circuit determines that a plurality of active threads to be executed of a plurality of thread group use different resources and different execution lanes of the plurality of execution lanes of the instruction execution processing circuit, the execution thread issuing circuit, issues those active threads to be executed of a plurality of thread groups for execution by the instruction execution processing circuit.

The execution lanes in the instruction execution processing circuit will typically have private functional unit and register file, and therefore there will be no resource contention, if different operations/instructions are performed the plurality of execution lanes. However, in some embodiments, there may be shared circuits, communication (message) paths, or functional units, or limitations on how the resource, for example functional units, or register file may be utilised in the instruction execution processing circuit. If the execution thread issuing circuit determines that a plurality of active threads to be executed of a plurality of thread group use resources that have resource contention, such that the plurality of active thread to be executed of a plurality of thread group cannot be executed by the instruction execution processing circuit in the same clock cycle. The execution thread issuing circuit will then issue the active threads to be executed of a for a subset of plurality of thread group where there is no resource contention.

The execution thread issuing circuit 45 or instruction execution processing circuit selects and providing the appropriate operation of the plurality of operations to the appropriate execution lane for execution by the instruction execution processing circuit.

In an embodiment, the execution thread issuing circuit may receive a plurality of decoded instruction and/or operations and may stall the issuing of one or more of the plurality of decoded instructions and/or operations to minimise the amount of resource and execution lane contention when executing the plurality of active threads to be executed of the plurality of thread groups. Thereby, maximising and optimising the number of active threads to be executed of plurality of thread groups that may be executed a clock cycle.

Thus, the method in an embodiment comprises (and the instruction execution processing circuit is in an embodiment correspondingly configured to), in response to an instruction in a program being executed by the threads of the thread group, each execution thread within the thread group ("warp") executing the instruction in the program (to, e.g. perform a processing operation) before the next instruction in the program is executed (and so on). Thus, it will be appreciated that threads are in an embodiment issued to execution lanes in the manner of the technology described herein in response to an, and in an embodiment each, (single) instruction in a program being executed.

The data processor can be any desired and suitable data processor in which execution threads can be processed together in thread groups. In general the data processor is in an embodiment a data processor that can perform vector (SIMD (single instruction multiple data)) processing, such as a graphics processor, a vector processor, a video processor, a DSP or a CPU (when performing SIMD processing). In an embodiment, the data processor is a graphics processor (graphics processing unit (GPU)).

The operation in the manner of the technology described herein may be performed for any suitable and desired program that is to be executed by the data processor. In the case of a graphics processing unit, the program may be, and is in an embodiment, a (graphics) shader program. The program may be, for example, a geometry shader program (a program for executing geometry shading operations), a vertex shader program (a program for executing vertex shading operations), or a fragment shader program (a program for executing fragment shading operations).

The program will comprise a sequence of instructions to be executed by the execution threads. The set (sequence) of instructions being executed for the program can be any desired and suitable instructions that would typically be executed by plural threads. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store-type instructions (such as blend or store instructions).

In an embodiment, the technology described herein is used for and when the data processor (the execution thread issuing circuit and instruction execution processing circuit of the data processor) is issuing threads or executing a (programmable) processing stage of a data processing pipeline. In this case therefore, the execution processing circuit will be executing a program (a set of instructions) to perform processing operations of a (programmable) processing stage of a data processing pipeline, with thread groups being issued to the instruction execution processing circuit to execute the (programmable) processing stage in the manner of the technology described herein.

The operation in the manner of the technology described herein can be, and is in an embodiment, used for plural processing stages of a data processing pipeline (where the pipeline comprises plural programmable processing stages). In an embodiment, the operation in the manner of the technology described herein is used for all (programmable) processing stages that the data processor, e.g. graphics processing unit, may be required to execute.

The processing stage can comprise any suitable and desired (programmable) processing stage of a data processing pipeline.

In an embodiment, the processing stage is a programmable processing stage of a graphics processing pipeline. In this case, the processing stage in an embodiment comprises a programmable shading stage (shader). The programmable processing stage that the program is executing may, for example, be a geometry shading stage (geometry shader), a vertex shading stage (vertex shader), a fragment shading stage (fragment shader), or a compute shader.

The operation in the manner of the technology described herein may be performed by and for each and every program and/or (programmable) processing stage that the data processor executes, or only for particular categories or types of program or processing stage but not for other categories or types of program or processing stage (e.g. where the type of program or processing stage is unlikely to involve similar input and/or output data for different threads within a thread group).

Each execution thread and/or thread group can relate to any suitable and/or desired work item that the program in question is to be executed for. For example, in the case of a graphics processing unit, each thread may correspond to a vertex or a sampling (fragment) position, with the thread groups corresponding to appropriate sets of plural vertices or sampling positions. For example, each thread group ("warp") may correspond to a graphics fragment, with each thread in the thread group then corresponding to a respective sampling position that the fragment represents.

Thread groups may be provided by an appropriate thread group generator and scheduler of the data processor, that generates thread groups for execution. This may depend, for example, upon what "work items" the threads and thread groups represent. For example, where threads correspond to pixels/sampling points, there will be a rasterisation step/stage which generates the threads. For vertex shading or graphics compute processing, there will be an appropriate vertex processing/compute processing stage that, e.g., generates the threads and thread groups. Other arrangements would, of course, be possible.

The result or results generated by executing the instructions for the active threads of the thread group or groups may be used as desired. For example, they may be output, e.g. to external memory, and/or they may be provided for, and used by, further instructions in the set of instructions (in the program) being executed.

In all cases, the result(s) may be used by the data processor as generated output. The output that is generated by the data processor can be any suitable and desired output, such as in the case of a graphics processing unit, a render output, such as a frame (image) to be displayed, a texture (in a render-to-texture) operation, etc.

This may then be repeated for the next thread group, and so on.

The technology described herein has been described above with reference to the operation of the data processor in general. In the case where the data processor includes multiple processing cores, then each processing core can, and in an embodiment does, operate in the manner of the technology described herein (i.e. such that each processing core has its own respective execution processing circuit, thread issuing circuit, etc., all of which are operable in the manner of the technology described herein).

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

Other arrangements would, of course, be possible.

The technology described herein can be used for all forms of output that a data processor (and processing pipeline) may be used to generate. For example, in the case of graphics processing, the graphics processing pipeline may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of data processor and data processing system. It is particularly applicable to tile-based graphics processing units and graphics processing systems. Thus, in an embodiment, the data processor is a tile-based graphics processing unit (and pipeline).

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry/circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a video camera that generates the arrays of data elements.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that the techniques for handling groups of execution threads described herein can be used in other non-graphics contexts in which groups of threads are used.

Particular embodiments will now be described with reference to the Figures.

FIG. 1 shows a typical graphics processing system. An application 2, such as a game, executing on a host processor 1, typically a CPU, will require graphics processing operations to be performed by an associated graphics processing unit (GPU) (graphics processing unit) 3. To do this, the application will generate API (Application Programming Interface) calls that are interpreted by a driver 4 for the graphics processing unit 3 that is running on the host processor 1 (e.g. CPU) to generate appropriate commands to the graphics processing unit 3 to generate graphics output required by the application 2. To facilitate this, a set of "commands" (which may comprise commands, data structures and programs) will be provided to the graphics processing unit 3 in response to commands from the application 2 running on the host system 1 for graphics output (e.g. to generate a frame to be displayed).

Figure 2:
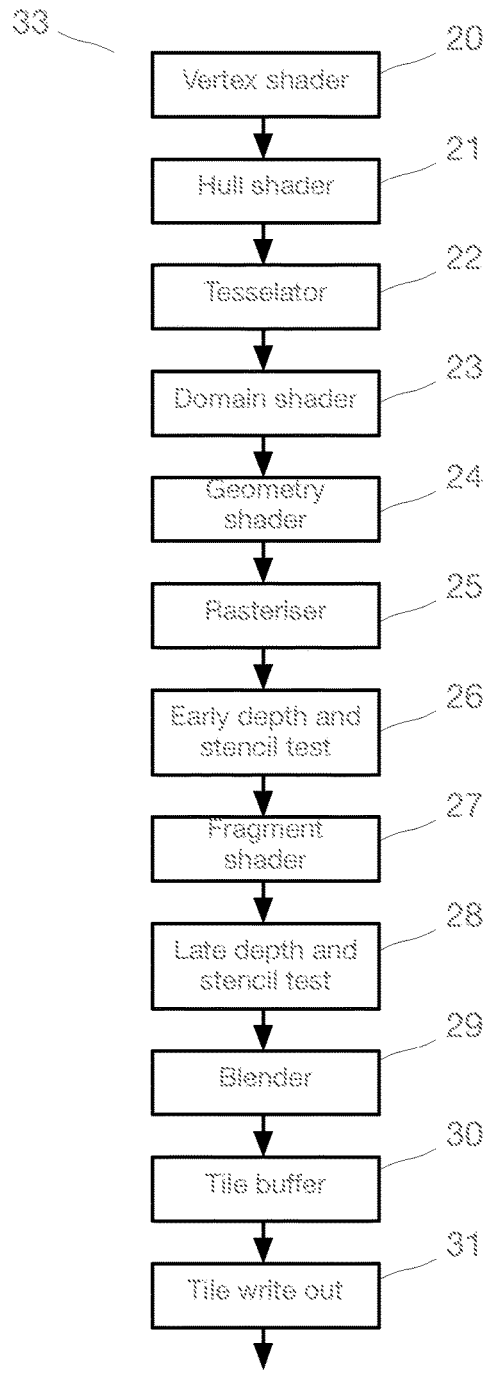
FIG. 2 shows a graphics processing pipeline.

FIG. 2 shows a graphics processing pipeline 33 that is executed by the graphics processing unit 3 in the present embodiment in more detail.

The graphics processing pipeline 33 shown in FIG. 2 is a tile-based renderer and will thus produce tiles of a render output data array, such as an output frame to be generated. The graphics processing pipeline 33 shown in this example comprises rasterization, however, the technology disclosed herein is also applicable to hybrid-ray tracing and raytracing. As will be appreciated by those skilled in the art hybrid-ray tracing, and/or ray tracing may comprise other elements in the graphics pipeline that are not illustrated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 33 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuit(s) and/or processing logic, etc., for performing the necessary operation and functions.

As shown in FIG. 2, the graphics processing pipeline 33 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 33. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 33.

The rasterisation stage 25 of the graphics processing pipeline 33 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives. The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) the new fragments issuing from the rasteriser 25 with the depth values of fragments that have already been rendered (these depth values are stored in a depth (Z) buffer that is part of the tile buffer to determine whether the new fragments issuing from the rasteriser 25 will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments issuing from fragment shading stage should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (e.g. a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing unit.

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a display or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 33 would, of course, be possible.

The above describes certain features of the operation of a graphics processing system shown in FIG. 1. Further features of the operation of the graphics processing system shown in FIG. 1 in accordance with embodiments of the technology described herein will now be described.

As can be seen from FIG. 2, the graphics processing pipeline 33 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by an application (reference numeral 2 in FIG. 1).

To do this, an application provides the shader programs implemented using a high-level shader programming language, such as GLSL (Open Graphic Language Shader Language), HLSL (High Level Shader Language), MSL (Metal Shading Language), OpenCL (Open Computing Language), etc. These shader programs are then translated by a shader language compiler to binary code for the target graphics processing pipeline 33. This may include the creation of one or more intermediate representations of the program within the compiler. The compiler may, e.g., be part of the driver (reference numeral 4 in FIG. 1), with there being a special API call to cause the compiler to run. The compiler execution can thus be seen as being part of the draw call preparation done by the driver in response to API calls generated by an application. (Other compiler arrangements would, of course, be possible.)

Figure 3:
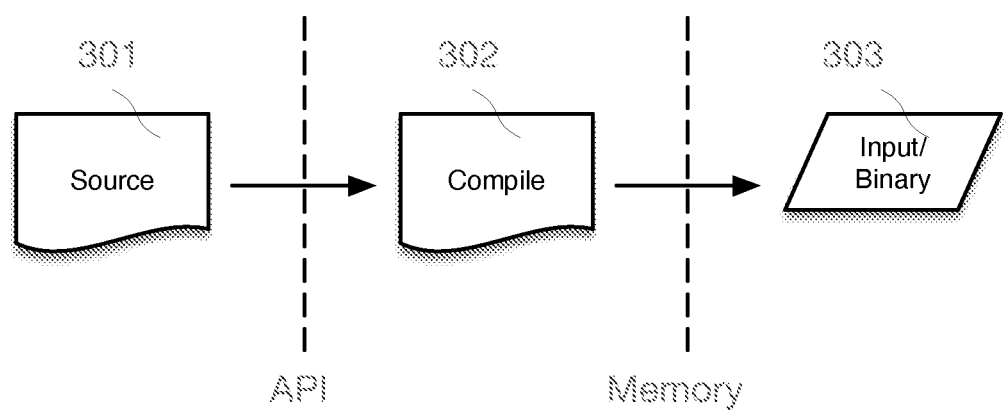
FIG. 3 shows schematically the compiling of a shader program for execution by a graphics processing pipeline.

FIG. 3 illustrates and shows the shader program being provided in the high level shader programming language 301 by the application 2 to the driver 4, which then compiles 302 the shader program to the binary code 303 for the graphics processing pipeline 33.

As discussed above, each shader in the graphics processing pipeline is a processing stage that performs graphics processing by running small programs for each work item in a graphics output to be generated (an item in this regard is usually a vertex, or a sampling position). For each work item to be processed, an execution thread that will execute the corresponding shader program is issued to appropriate execution lanes (a programmable processing circuit(s)) that then executes the shader program for the execution thread in question.

The present embodiments relate to systems where threads that are to execute a shader program can be organised into groups ("warps") of threads that are to be run in lockstep, one instruction at a time.

In the case of the fragment shader 27, for example, the fragment shading program that is being executed may be run once for each sampling position (or point) that is to be processed, with one execution thread being spawned for each sampling position. The sampling positions (and thus accordingly their corresponding execution threads) may be organised into and processed as groups of plural sampling positions (and thus threads).

In such arrangements, in order to execute the execution threads of a thread group, e.g., so as to perform a fragment shading operation, the execution threads of a thread group will be appropriately issued to appropriate functional units, such as arithmetic processing units, to perform the processing operations required by the shader program in question. In the case where threads can be organised into and executed as respective thread groups of plural threads, then typically the functional units will be arranged as plural execution lanes, with each execution lane being able to perform processing operations for an execution thread of a thread group.

As such, each functional unit (or set of associated functional units) will be arranged and operable as a plurality of execution lanes, to which threads of a thread group can be issued for execution. When a thread group is to be executed, appropriate control logic will issue the relevant data and instruction to be executed to the appropriate execution lanes of a functional unit or set of functional units, so that the instruction in question can be executed for the threads of the thread group by the functional unit(s).

Figure 4:
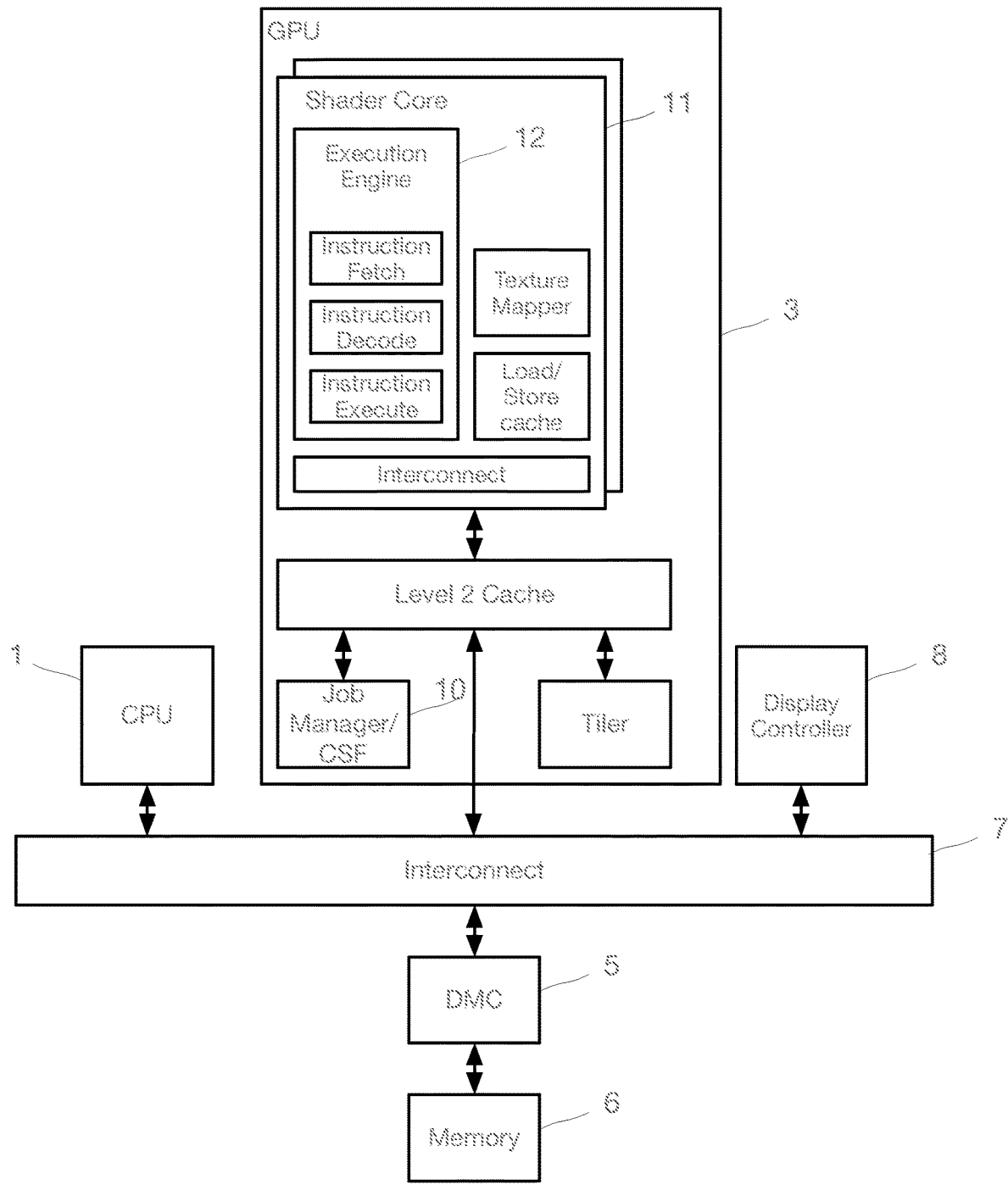
FIG. 4 show an exemplary graphics processing system.

FIG. 4 shows an exemplary graphics processing system. The CPU (host) 1, Display Controller 8 and GPU 3 are connected to an Interconnect 7. The CPU 1, executes an application that requires graphics processing operations to be performed by the GPU 3. To do this, the application will generate API calls that are interpreted by a driver for the GPU 3, that is running on the CPU 1. The driver executing on the CPU 1 generates commands, data structures and instructions. The GPU 3 generates memory write transactions to transfer the commands, data structures and instructions. The GPU sends the memory write transactions to the Interconnect 7, where the transactions are routed to the DMC (Dynamic Memory Controller) 5. The DMC 5 writes the commands, data structures and instructions to memory 6. The Job Manager 10 of the GPU 3 reads the commands, data structures and instruction from memory 6 by submitting read transactions to the memory system. The read transactions are sent to the Level 2 Cache in the GPU, if the data for a transaction is in the cache, the data is returned to the Job Manager 10, from the Level 2 Cache. Otherwise, if the data is not in the Level 2 Cache, a read transaction is issued to the Interconnect 7, which routes the read transaction to the DMC The DMC requests read data from the Memory 6. In response to the read request, the Memory 6 returns the read data to the DMC 5. The DMC 5 then transfers the read data to the Interconnect 7, which routes the data to the GPU 3. The read data is written into the appropriate entry in the Level 2 Cache, and sent to the Job Manager 10. and submits the graphics processing operation to at least one Shader Core 11. The Shader Core 11 performs the graphics processing operations using the Execution Engine 12. The Shader Core 11 writes the resulting frame buffer data to memory 6 using the Interconnect 7 and DMC 5. When the GPU 3 has rendered the frame, the Display Controller 8 reads the frame buffer from memory 6, using the Interconnect 4 and DMC 5 and outputs the frame for display.

Figure 5:
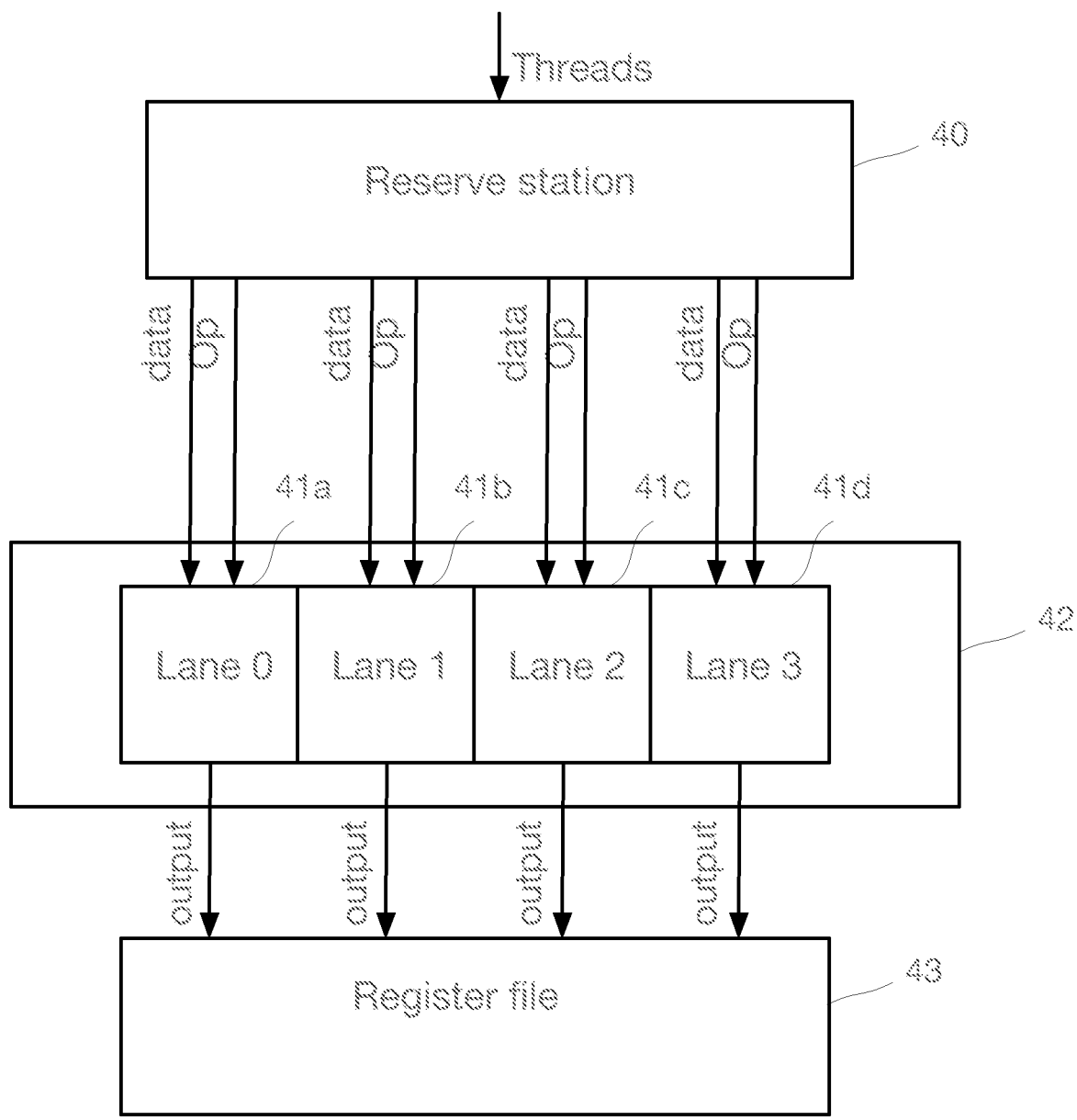
FIG. 5 shows an exemplary schematic the arrangement of execution lanes.

FIG. 5 illustrates and shows an instruction execution processing circuit 42 arranged as four execution lanes 41a, 41b, 41c & 41d, and appropriate execution thread issuing circuit (control logic) 40 for issuing the appropriate data and an operation, (where an operation is defined by an instruction), for each thread of a thread group to an execution lane (e.g. one of 41a, 41b, 41c or 41d) of the set of execution lanes, according to the present embodiments. (The reserve station (execution thread issuing circuit) 40 will receive threads for execution, e.g., from a thread spawner or a thread spawning process of the graphics processing unit.) It will be appreciated that in other embodiments, the instruction execution processing circuit 42 may be arranged as fewer than or more than four execution lanes, e.g. two or eight.

The functional units may comprise, for example, one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processing unit), store-type units (such as blend or store units), etc.

Each execution lane (e.g. one of 41a, 41b, 41c or 41d) of the instruction execution processing circuit 42 also has access to (and available to it) a set of plural registers 43 for storing data values associated with and for the execution lane (i.e. for storing data values being processed for the execution thread that the execution lane is currently executing). This then facilitates the handling of execution threads and their data values in an execution lane without the need to (always) require access to memory (to the memory system of the graphics processing system). The registers for the execution lanes can be arranged in register file banks, as desired, and as appropriate.

Figure 6:
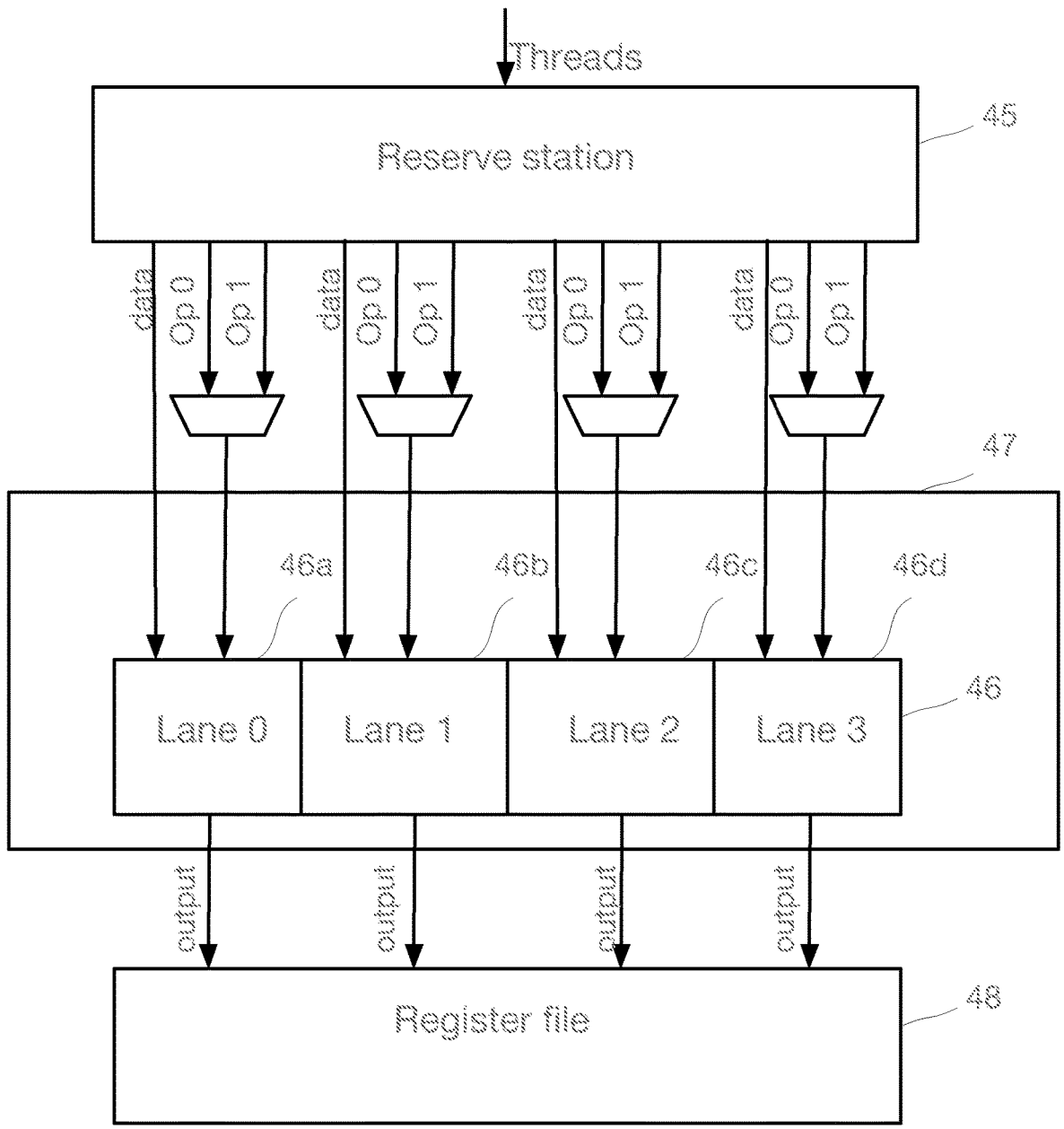
FIG. 6 shows a schematic arrangement of execution lane in accordance with an embodiment.

FIG. 6 illustrates and shows a control logic (circuit) 45 and instruction execution processing circuit 47 according to an embodiment. The instruction execution processing circuit 47 is arranged as a set of execution lanes 46a, 46b, 46c, and 46d, and appropriate execution thread issuing circuit (control logic) 45 is provided for issuing the appropriate data and a first operation and a second operation for each thread of a thread group to an execution lane 46 of the set of execution lanes, according to the present embodiments. Although the set of execution lanes in FIG. 6 is depicted as comprising 4 lanes, the claims not limited as such, and a set may comprise any fewer or more lanes.

The execution thread issuing logic (circuit) 45 receives threads from a first thread group and a second thread group. The first thread group performing a first operation, operation 0, and second thread group performing a second operation, operation 1. Where the first and second operations are defined by at least one instruction.

The execution thread issuing logic (circuit) 45 determines whether the active thread to be executed from the first and second of thread groups use different execution lanes 46a, 46b, 46c, 46d and, if so, the execution thread issuing logic (circuit) 45 issues active threads to be executed from the first and second thread groups substantially simultaneously, in the same clock cycle, to the instruction execution processing circuit 47. In an example, the execution thread issuing logic (circuit) 45 sends the first operation and second operation for each thread of a thread group to an execution lane 46a, 46b, 46c, 46d. For each execution lane 46a, 46b, 46c, 46d, the instruction execution processing circuit 47, determines whether the active thread to be executed for the execution lane 46a, 46b, 46c, 46d is from the first thread group and, if so, the first operation is selected, otherwise if the active thread is from the second thread group, the second operation is selected.

In another embodiment the execution thread issuing logic (circuit) 45 may for each execution lane 46a, 46b, 46c, 46d, determine whether the active thread to be executed for the execution lane 46a, 46b, 46c, 46d, is from the first thread group or second thread group. If the active thread is from the first thread group the first operation is selected, or if the active thread is from the second thread the second operation is selected. The execution thread issuing logic (circuit) 45 sends the selected operation to the execution lane 46, of the instruction execution processing circuit 47.

(The reserve station (execution thread issuing logic) 45 will receive threads for execution, e.g., from a thread spawner or a thread spawning process of the graphics processing unit.)

Figure 7:
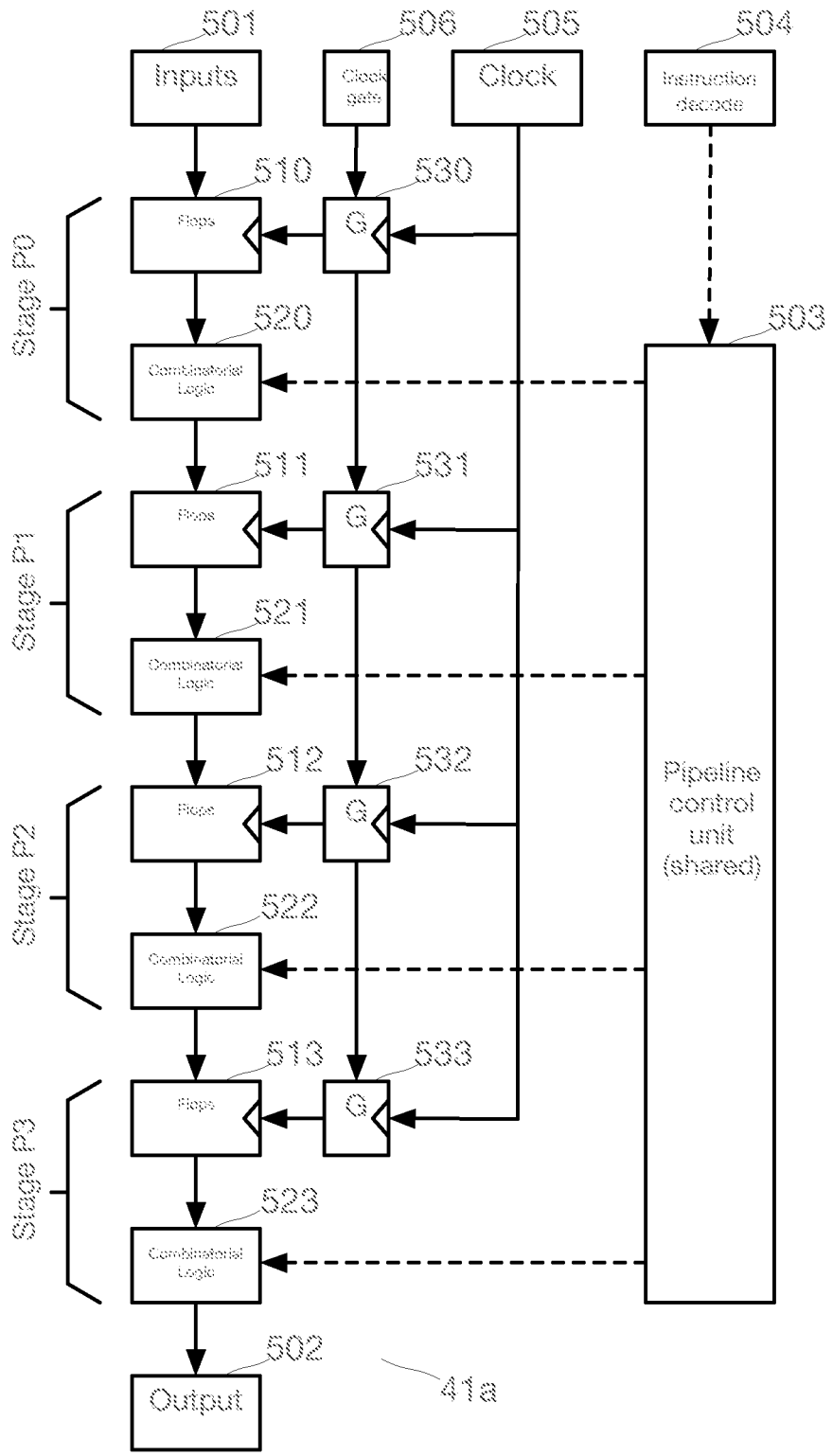
FIG. 7 shows an exemplary schematic the arrangement of execution lane pipeline.

FIG. 7 shows in more detail an execution lane (one of 41a, 41b, 41c or 41d) in the form of an arithmetic unit pipeline of a graphics processing unit 3, which can perform arithmetic processing operations for an execution thread that has been issued to it for instruction execution processing 40, according to the present embodiment.

The execution lane 41a of FIG. 7 is operable to perform a graphics processing operation on an input data value, and then provide the result of the processing operation as an output data value. The input data value is stored as a binary data value in an input register 501, and the output data value is stored as a binary data value in an output register 502.

The processing operation that the pipeline is operable to perform can be any suitable processing operation, and in the present embodiment is performed as a series of four processing operations. Thus, as shown in FIG. 7, in the present embodiment, the pipeline 41a is arranged as a pipeline (series) of four arithmetic processing stages P0-P3, with each arithmetic processing stage P0-P3 being operable to execute one instruction during a clock cycle of clock 505. It will be appreciated that in other embodiments, the "depth" of the pipeline may be fewer or more than four processing stages, such as two or eight processing stages.

As shown in FIG. 7, at each processing stage P0-P3, a binary data value stored in flip-flops (latches) 510-513 is provided as an input to a combinatorial logic circuit 520-523 (functional unit), and the combinatorial logic circuit 520-523 (functional unit) then performs an e.g. arithmetic operation on the input to produce a binary output. The output of a combinatorial logic circuit 520-523 may then be stored in flip-flops (latches), and may be provided as the input to the next stage (functional unit), and so on. The final output data value of the pipeline is the output of the combinatorial logic circuit 523 (functional unit) of the final stage P3 of the pipeline 41a.

As shown in FIG. 7, the execution lane 41a is operated under the control of a pipeline control unit 503, which indicates to the combinatorial logic circuit 520-523 (functional unit) at each stage P0-P3 the operation that is to be performed during a clock cycle, e.g. by issuing appropriate opcodes to the combinatorial logic circuits 520-523. The pipeline control unit 503 is in turn controlled by instruction decode circuit 504, which operates to decode an instruction in the shader program being executed, and to cause the pipeline control unit 503 to control the execution lane 41a to perform the required graphics processing operation(s) to execute the shader instruction in question.

The execution lane 41a may also include clock gates 530-533 for performing clock gating, under the control of clock gate control circuit 506, as will be discussed further below.

FIG. 7 shows only a single execution lane 41a in detail for the sake of clarity. However, in the present embodiment, the instruction execution processing circuit 42 is arranged as four execution lanes 41a, 41b, 41c and 41d, with the instruction decode circuit 504 and pipeline control circuit 503 then being shared across the four execution lanes 41a, 41b, 41c, and 41d collectively, such that a single instruction in the shader program is decoded, and then executed by all of the four execution lanes in a given clock cycle. Thus, operations defined by instructions in the shader program are executed over a physical SIMD (single instruction, multiple data) arithmetic datapath. Although not shown, in an embodiment of the technology disclosed herein, there may be multiple instruction decode circuits 504, or an instruction decode circuit 504 that is operable to decode multiple instructions per clock cycle. The instruction decode circuit 504, may decode an instruction whilst the current instruction is being executed by the instruction execution processing circuit 42. Therefore, there may be multiple decoded instructions waiting to be issued. Where it is determined that multiple operations may be executed by the instruction execution processing circuit 42 in a clock cycle, the pipeline control circuit 503 is operable to execute a plurality of operations over all of the four execution lanes in a given clock cycle.

In some embodiments threads may be arranged into groups ("warps"), where the number of threads per group match the number of execution lanes that are provided, in which case each thread within a thread group can be issued to a respective one of the execution lanes for execution, i.e. such that an execution lane has only one execution thread from a thread group ("warp") issued to it per clock cycle. Such arrangements can allow each shader program instruction to be executed for all threads in a thread group in a single clock cycle, such that single-threaded execution performance can be increased, for example. For convenience, the term "wide warp" will be used herein, to describe this arrangement. In the wide warp execution lane configuration every thread in a thread group is executed simultaneously.

Therefore, in this arrangement the execution thread issuing circuit issues all the active threads to be executed for the thread group to the instruction execution processing circuit in a clock cycle.

Therefore, in the wide warp execution lane configuration typically a new instruction is issued every processor cycle.

For a wide warp arrangement, an active execution thread comprises all the threads of the thread group that are to be issued for execution across the different executions lanes in the processing cycle.

For a deep warp arrangement, active execution thread comprises the subset of threads of the thread group that are to be issued for execution across the different executions lanes in the processing cycle.

Figure 8:
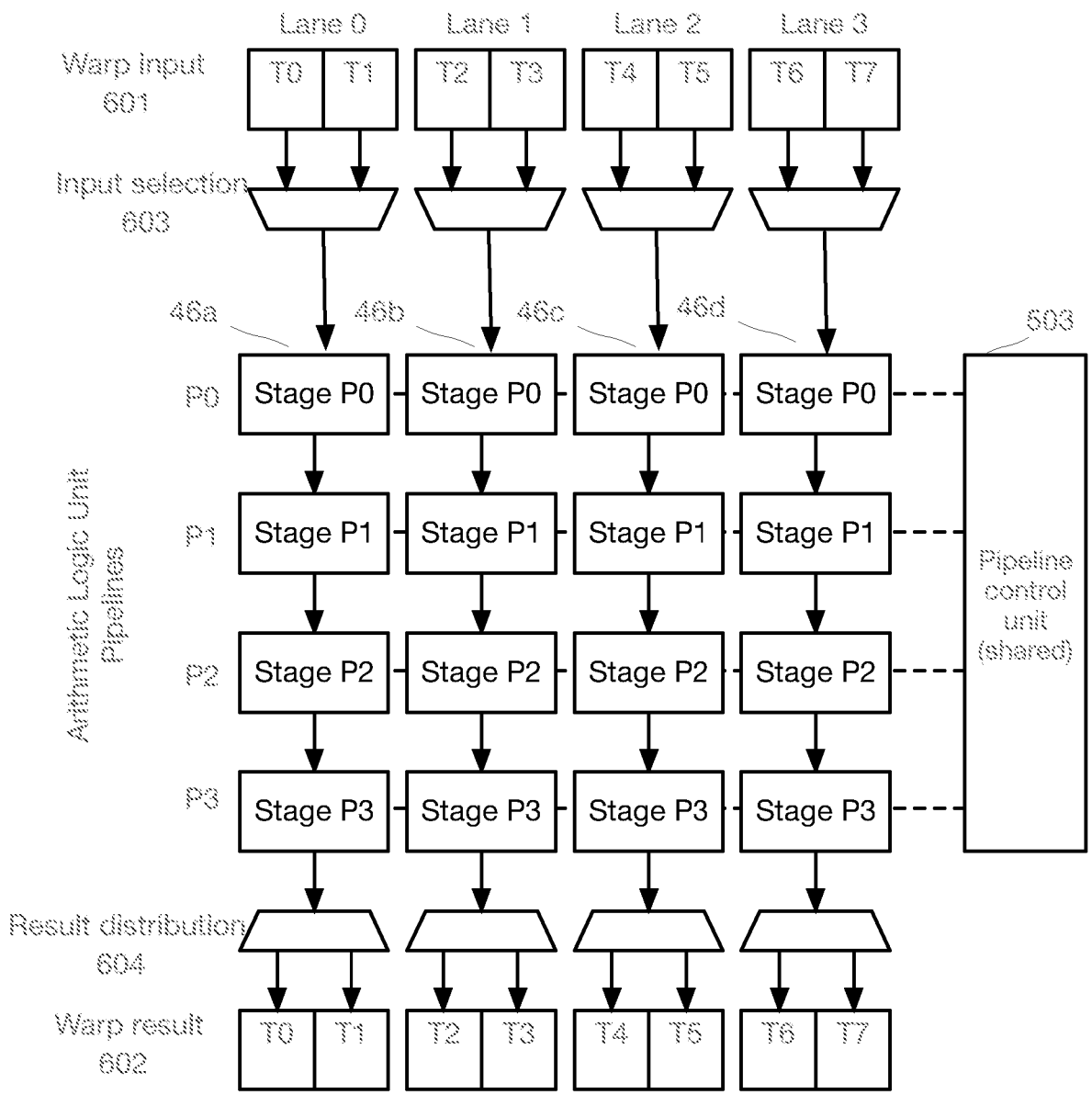
FIG. 8 shows an exemplary deep warp execution lane configuration.

FIG. 8, illustratively shows an exemplary deep warp execution lane configuration where the instruction execution processing circuit 47 is arranged as four execution lanes, 46a, 46b, 46c, and 46d, which each comprising four stages P0-P3, which operate under the control of the (shared) pipeline control circuit 503, as discussed above with reference to FIG. 7.

In FIG. 8, execution threads are arranged in thread groups ("warps") that each include eight threads, T0-T7, and the execution processing circuit 47 is arranged as four execution lanes 46a, 46b, 46c and 46d. Accordingly, there are fewer execution lanes than there are execution threads within a thread group ("warp"). Plural threads within a thread group ("warp") are accordingly issued to the same execution lane, and executed over plural clock cycles. To facilitate these arrangements, execution thread issuing circuit 45 is operable to issue plural execution threads from a thread group ("warp") to the same execution lane (one of 46a, 46b, 46c, or 46d) for execution. As shown in FIGS. 8, each execution lane pipeline 46a, 46b, 46c, 46d then has a corresponding input selection stage 603 to select the appropriate input thread from the execution threads 601 that have been issued to it for execution. An execution lane that has had plural execution threads from the same thread group ("warp") issued to it for execution then executes those execution threads successively over plural clock cycles, one thread after the next. For convenience, the term "deep warp" will be used herein, to describe this arrangement. The deep warp functional unit configuration may be particularly advantageous in graphics processing, where it is common for a subset of threads to have the same or similar data values.

In the deep warp functional unit configuration a subset of threads, the threads to be executed, in a thread group are issued by the execution thread issuing circuit to the instruction execution processing circuit 47 for execution simultaneously in a clock cycle. Therefore, the execution of the threads in a thread group, using the same instruction, is performed over a plurality of clock cycles. Therefore, in this arrangement only the (active) threads of a thread group to be executed are issued for execution by the execution thread issuing circuit in a clock cycle.

Therefore, in the deep warp execution lane configuration a new instruction is not issued every processor cycle. For example, for a configuration where the thread group size is twice size as large as the number of execution lanes, it will take two clock cycles to execute all the threads in a thread group. Therefore, a new instruction will be executed every other clock cycle, and therefore the instruction fetch, and instruction decode unit may be idle every other cycle. In the technology described herein, the idle instruction fetch and instruction decode clock cycles may be used to fetch and decode divergent instructions in the instruction stream.

FIG. 9 to FIG. 16 shows an instruction pipeline sequence. Instructions are shown as columns, and clock cycle as rows in the table. The pipeline sequence shows several instructions, for example, instruction 1, instruction 2 and instruction 3. The pipeline diagram shows three pipeline stages, instruction fetch, IF, instruction decode, ID, and execute, EX. Other arrangements for the graphics processing pipeline 33 would, of course, be possible. As an example, there may be more pipeline stages, for example instruction fetch, instruction decode, execute, memory and write back. Some of these stages may be processed over multiple clock cycles, for example execute 1 and execute 2 stages.

Figure 9:
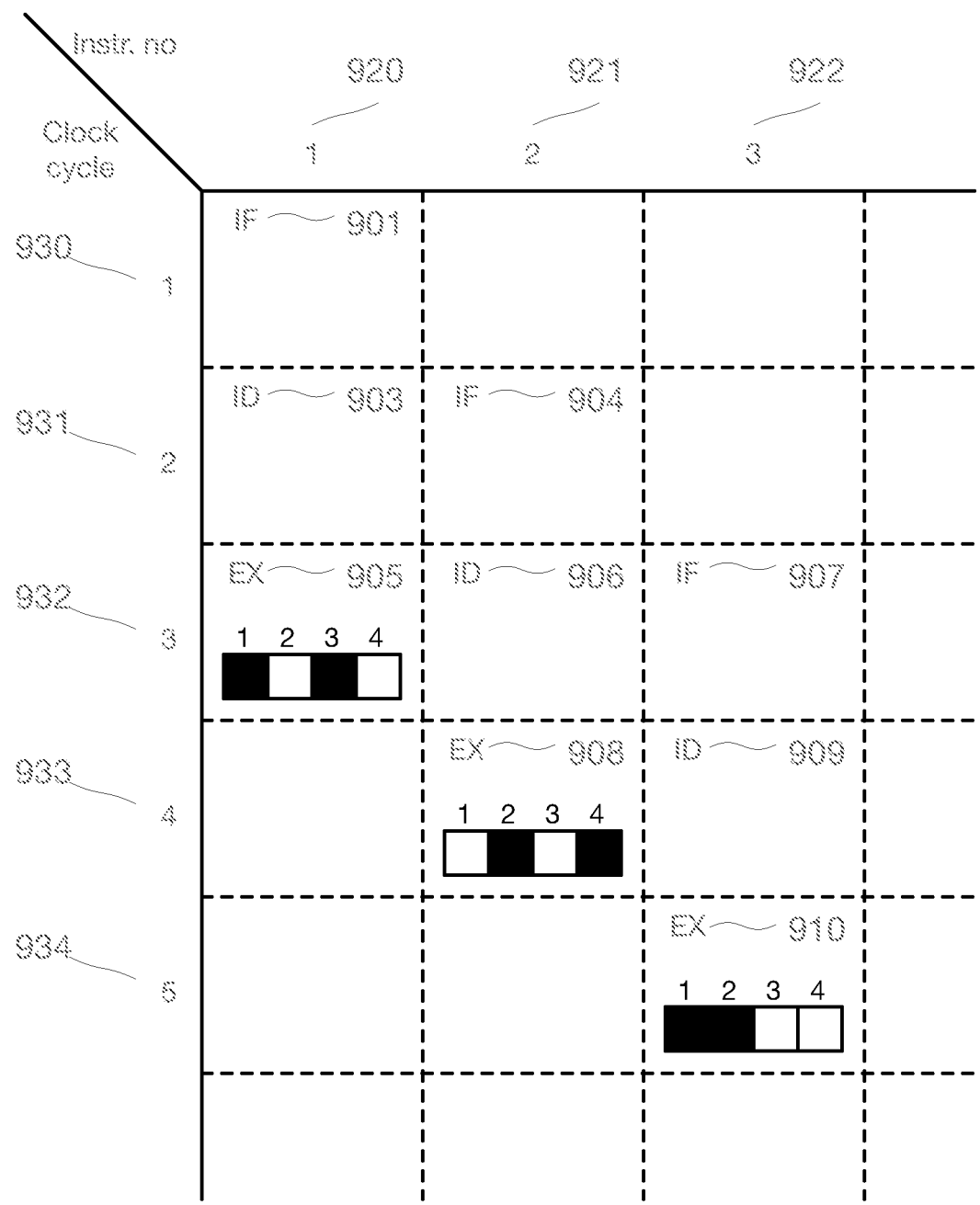
FIG. 9 shows an exemplary instruction pipeline sequence for a wide warp arrangement.

FIG. 9 shows an exemplary instruction pipeline sequence for a wide warp arrangement in accordance with prior art. In the arrangement there is a single instruction fetch unit, instruction decode unit and execute unit.

In the first processor cycle (930), instruction 1 (920) instruction fetch (901) is performed.

In the second processor cycle (931), simultaneously instruction 1 (920) instruction decode (903), and instruction 2 (921) instruction fetch (904) are performed.

In the third processor cycle (932), simultaneously instruction 1 (920) execute (905), instruction 2 (921) instruction decode (906), and instruction 3 (922) instruction fetch (907) are performed. Instruction 1 (920) execute (905) shows, for this instruction, thread 1 and thread 3 are active, whilst thread 2 and 4 thread are inactive. Therefore, execution lanes 1 and 3 are active, and execution lanes units 2 and 4 are inactive.

In the fourth processor cycle (933), simultaneously instruction 2 (921) execute (908), instruction 3 (922) instruction decode (909) are performed. Instruction 2 (921) execute (908) shows that thread 2 and thread 4, and the respective execution lanes units, are active, whilst thread 1 and thread 3, and the respective execution lanes, are inactive.

In the fifth processor cycle (934) instruction 3 (922) execute (910) is performed. Instruction 3 (922) execute (910) shows that thread 1 and thread 2, and the respective execution lanes units, are active, whilst thread 3 and thread 4, and the respective execution lanes units, are inactive.

Figure 10:
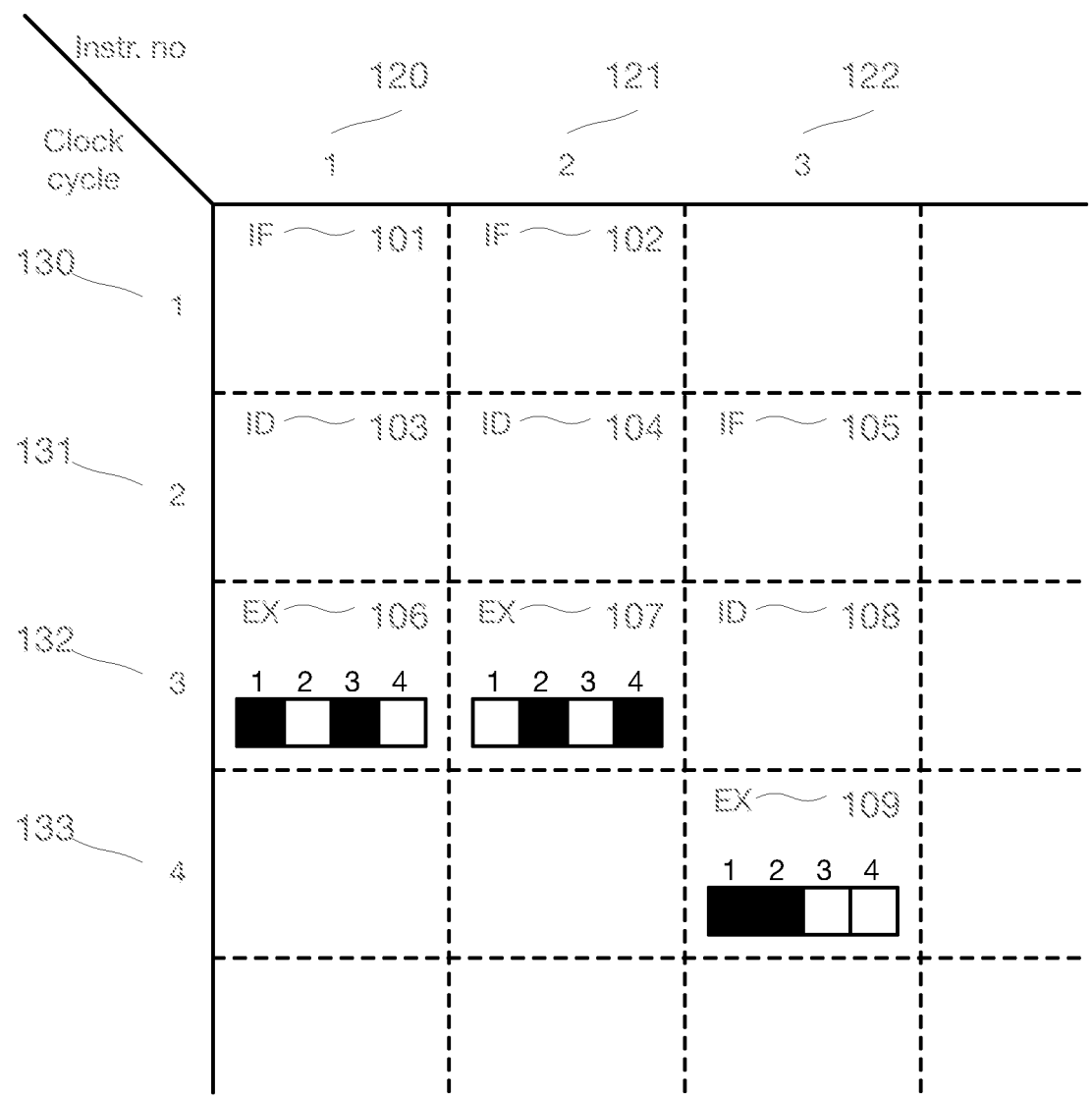
FIG. 10 shows an instruction pipeline sequence for a wide warp arrangement in accordance with an embodiment.

FIG. 10 shows an instruction pipeline sequence for a wide warp arrangement in accordance with an embodiment. In the arrangement there is a dual instruction fetch unit and dual instruction decode unit and a single execute unit. The instruction fetch unit and instruction decode unit is therefore able to fetch and decode two instructions per processor cycle.

The embodiment has an execution thread issuing circuit operable to determine whether active threads to be executed from a first thread group associated with a first operation, and active threads to be executed from a second thread group associated with a second operation, use mutually exclusive execution lanes of the plurality of execution lanes. The execution thread issuing circuit is also operable to determine if there is no resource contention if both the active threads to be executed from a first thread group, and active threads to be executed from a second thread group are executed substantially simultaneously, in a clock cycle. The first operation and second operation are associated with at least one instruction.

The execution thread issuing circuit 45, or the instruction execution processing circuit 47 determines whether the thread to be executed on each execution lane is from the first thread group or the second thread group. Whereby, if the thread for an execution lane is determined to be an active thread to be executed for the first thread group, the first operation selected for execution for the execution lane, otherwise if the execution thread issuing circuit 45 determines the active thread to be executed for the execution lane is for the second thread group the second operation is selected for execution for the execution lane.

By providing this circuit, in some scenarios a plurality of instructions can be executed simultaneously, thereby increasing throughput, efficiency and reducing latency.

In the first processor cycle (130), instruction fetch, (101, 102), is performed for both instruction 1 (120), and instruction 2 (121).

In the second processor cycle (131), instruction decode, (103, 104), is performed for both instruction 1 (120) and instruction 2 (121). Instruction 3 (122) instruction fetch (105) is performed simultaneously.

In this example, threads 1 and 3 of instruction 1 (120), and instruction 2 (121) threads 2 and 4 are active. Therefore, even though in this arrangement there is only a single execute unit, the execution thread issuing circuit determines that both instructions may be executed simultaneously in the same clock cycle.

Therefore, in the third processor cycle (132), execute (106, 107) is performed for both instruction 1 (120) and instruction 2 (121). Instruction 3 (122) instruction decode (108) is performed simultaneously.

In the fourth processor cycle (133) instruction 3 (122) execute (109) is performed.

Figure 11:
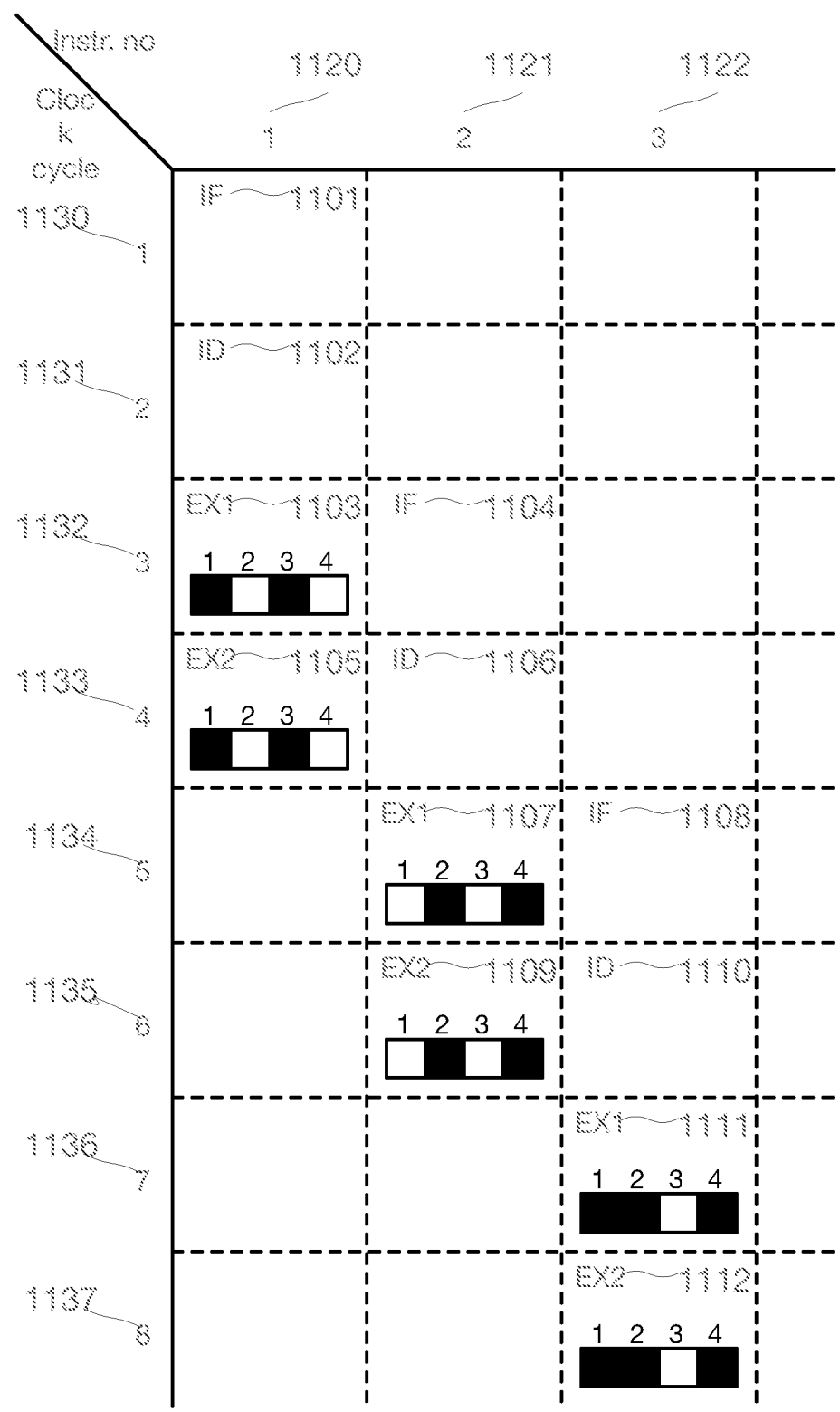
FIG. 11 shows an exemplary instruction pipeline sequence for a deep warp arrangement.

FIG. 11 shows an exemplary instruction pipeline sequence for a deep warp arrangement in accordance with prior art. In the example there is a single instruction fetch unit, instruction decode unit and execute unit. The execute unit comprises four execution lanes. In the example there are eight threads in a thread group (warp). Therefore, a thread group is executed over two processor cycles.

In the first processor cycle (1130), instruction 1 (1120) instruction fetch (1101) is performed.

In the second processor cycle (1131), instruction 1 (1120) instruction decode (1102) is performed.

In the third processor cycle (1132), instruction 1 (1120) a first portion (in this example half) of the threads of the thread group (the active threads) are executed (1103). In this example execution lanes 1 and 3 are active. Simultaneously, instruction 2 (1121) instruction fetch (1104) is performed.

In the fourth processor cycle (1133), instruction 1 (1120) a second portion (in this example half) of the threads of the thread group (the active threads) are executed (1105). In this example execution lanes 1 and 3 are active. Simultaneously, instruction 2 (1121) instruction decode (1106) is performed.

In the fifth processor cycle (1134), instruction 2 (1121) a first portion (e.g. half) of the threads of the thread group (the active threads) are executed (1107). In this example execution lanes 2 and 4 are active. Simultaneously, instruction 3 (1122) instruction fetch (1108) is performed.

In the sixth processor cycle (1135), instruction 2 (1121) a second portion (e.g. half) of the threads of the thread group (the active threads) are executed (1109). In this example execution lanes 2 and 4 are active. Simultaneously, instruction 3 (1122) instruction decode (1110) is performed.

In the seventh processor cycle (1136), instruction 3 (1122) a first portion (e.g. half) of the threads of the thread group (the active threads) are executed (1111). In this example execution lanes 1, 2 and 4 are active.

In the eighth processor cycle (1137), instruction 3 (1122) a second portion (e.g. half) of the threads of the thread group (the active threads) are executed (1112). In this example execution lanes 1, 2 and 4 are active.

Figure 12:
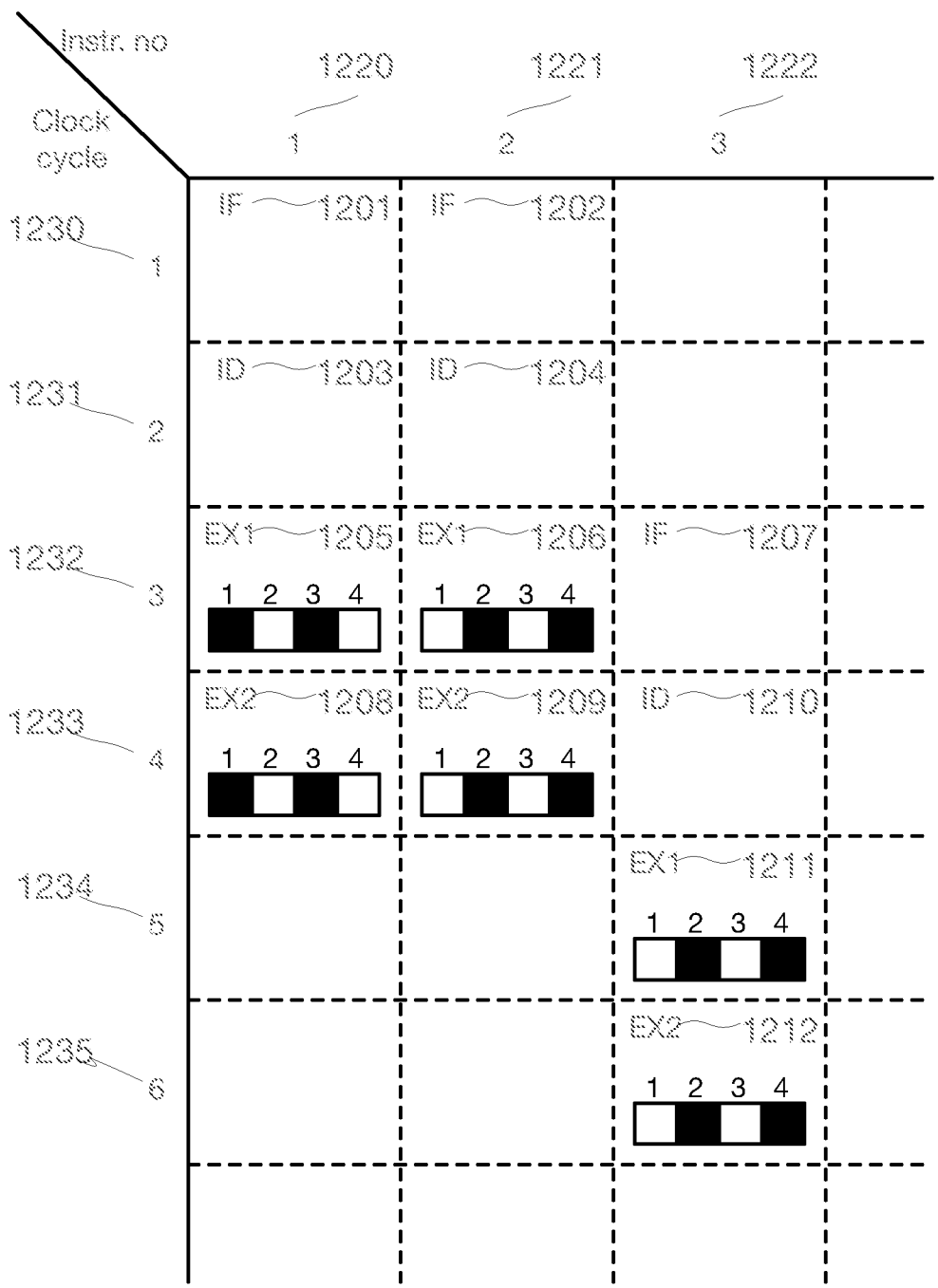
FIG. 12 shows an instruction pipeline sequence for a deep warp arrangement in accordance with an embodiment.

FIG. 12 shows an instruction pipeline sequence for a deep warp arrangement in accordance with an embodiment. In the arrangement there is a dual instruction fetch unit, dual instruction decode unit and a single execute unit. The instruction fetch unit and instruction decode unit is therefore able to fetch and decode two instructions per processor cycle.

Similar to the arrangement in FIG. 10, the embodiment has execution thread issuing circuit 45 operable to determine whether active threads to be executed from a first thread group associated with a first operation, and active threads to be executed from a second thread group associated with a second operation, use mutually exclusive execution lanes of the plurality of execution lanes. The execution thread issuing circuit is also operable to determine if there is no resource contention if both the active threads to be executed from a first thread group, and active threads to be executed from a second thread group are executed substantially simultaneously, in a clock cycle. The first operation and second operation are associated with at least one instruction.

The execution thread issuing circuit 45, or the instruction execution processing circuit 47 determines whether the thread to be executed on each execution lane is from the first thread group or the second thread group. Whereby, if the thread for an execution lane is determined to be an active thread to be executed for the first thread group, the first operation is selected for execution for the execution lane, otherwise if the execution thread issuing circuit 45 determines the active thread to be executed for the execution lane is for the second thread group the second operation is selected for execution for the execution lane.

By providing this circuit, in some scenarios a plurality of instructions can be executed simultaneously, thereby increasing throughput, efficiency and reducing latency.

In the first processor cycle (1230), instruction fetch (1201, 1202) is performed for instruction 1 (1220) and instruction 2 (1221).

In the second processor cycle, (1231) instruction decode (1203, 1204) is performed for instruction 1 (1220) and instruction 2 (1221).

In the example the first portion (e.g. half) of the active threads of the thread group for instruction 1 (1220), execution lanes 1 and 3 are active (1205), whereas in the first portion (e.g. half) of active threads of the thread group for instruction 2 (1221), execution lanes 2 and 4 are active (1206). Therefore, the active execution lanes for the first portion (e.g. half) of the active threads for instruction 1 (1220) and instruction 2 (1221) are mutually exclusive. The execution thread issuing circuit 45 is therefore able to issue the first portion (e.g. half) of the threads for both instruction 1 (1220) and instruction 2 (1221) simultaneously. Therefore, in the third processor cycle (1232), a first portion (e.g. half) of the threads of the thread group are executed (1205, 1206) for instruction 1 (1220) and instruction 2 (1221). Simultaneously instruction 3 (1222) instruction fetch (1207) is performed.

In the second portion (e.g. half) of the threads of the thread group for instruction 1 (1220), execution lanes 1 and 3 are active (1208), whereas in the second portion (e.g. half) of threads of the thread group for instruction 2 (1221), executions lanes 2 and 4 are active (1209). Therefore, the active execution lanes for the first portion (e.g. half) of the threads for instruction 1 (1220) and instruction 2 (1221) are mutually exclusive. The execution thread issuing circuit 45 is therefore able to issue the second portion (e.g. half) of threads for both instruction 1 (1220) and instruction 2 (1221) simultaneously. Therefore, in the fourth processor cycle (1233), a second portion (e.g. half) of the threads of instruction 1 (1220) and instruction 2 (1221) are executed (1208, 1209). Simultaneously instruction 3 (1222) instruction decode (1210) is performed.

In the fifth processor cycle (1234), instruction 3 (1222) a first portion (e.g. half) of the threads of the thread group for instruction 3 are executed (1211).

In the sixth processor cycle (1235), instruction 3 (1222) a second portion (e.g. half) of the threads of the thread group for instruction 3 are executed (1212).

Figure 13:
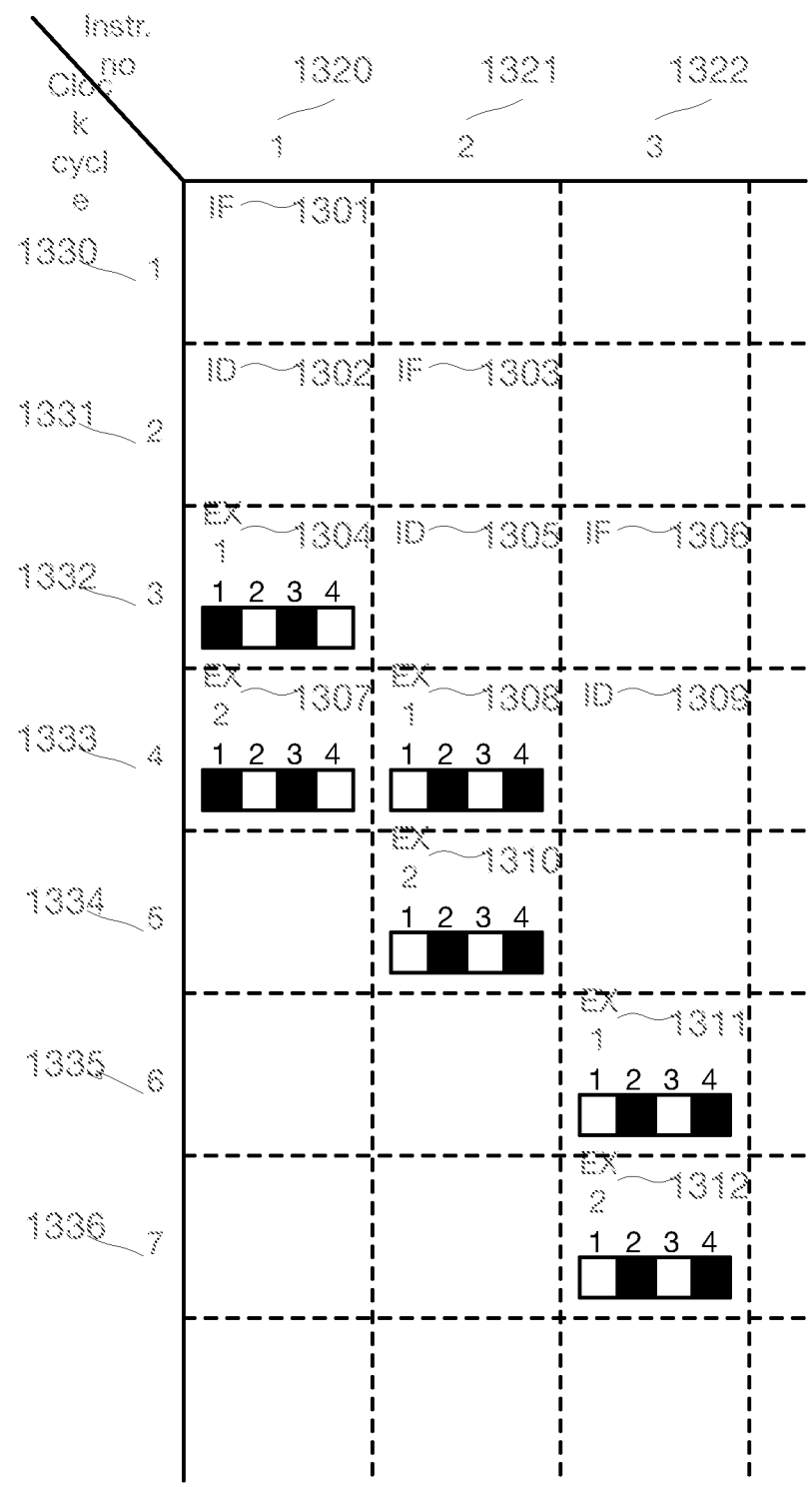
FIG. 13 shows an instruction pipeline sequence for a deep warp arrangement in accordance with an embodiment.

FIG. 13 shows an instruction pipeline sequence for a deep warp arrangement in accordance with an embodiment. In the arrangement there is a single instruction fetch unit, instruction decode unit and a execute unit.

Similar to the arrangement in FIG. 10, the embodiment has execution thread issuing circuit 45 operable to determine whether active threads to be executed from a first thread group associated with a first operation, and active threads to be executed from a second thread group associated with a second operation, use mutually exclusive execution lanes of the plurality of execution lanes. The execution thread issuing circuit is also operable to determine if there is no resource contention if both the active threads to be executed from a first thread group, and active threads to be executed from a second thread group are executed substantially simultaneously, in a clock cycle. The first operation and second operation are associated with at least one instruction.

The execution thread issuing circuit 45, or the instruction execution processing circuit 47 determines whether the thread to be executed on each execution lane is from the first thread group or the second thread group. Whereby, if the thread for an execution lane is determined to be an active thread to be executed for the first thread group, the first operation is selected for execution for the execution lane, otherwise if the execution thread issuing circuit determines the active thread to be executed for the execution lane is for the second thread group the second operation is selected for execution for the execution lane.

By providing this circuit, in some scenarios a plurality of instructions can be executed simultaneously, thereby increasing throughput, efficiency and reducing latency In the first processor cycle (1330), instruction 1 (1320) instruction fetch (1301) is performed.

In the second processor cycle (1331), instruction 1 (1320) instruction decode (1302) and instruction 2 (1321) instruction fetch (1303) is performed.

In the third processor cycle (1332) the first portion (e.g. half) of threads of the thread group for instruction 1 (1320) are executed (1304). Execution lanes 1 and 3 are active. Simultaneously, instruction 2 (1321) instruction decode (1305), and instruction 3 (1322) instruction fetch (1306) is performed.

In the example, the execution lanes used by the second portion (e.g. half) of threads (1307) for instruction 1 (1320) and first portion (e.g. half) of threads (1308) for instruction 2 (1321) are mutually exclusive. Therefore, both instruction 1 (1320) and instruction 2 (1321) can execute simultaneously on a single execute unit. Therefore, in the fourth processor cycle (1333) the second portion (e.g. half) of threads of the thread group (1307) for instruction 1 (1320) are executed. Simultaneously, the first portion (e.g. half) of threads of thread group (1308) for instruction 2 (1321) are executed. Instruction 3 (1322) instruction decode (1309) is also performed.

In the example, the execution lanes used by the second portion (e.g. half) of threads (1310) for instruction 2 (1321) and first portion (e.g. half) of threads (1311) for instruction 3 (1322) are not mutually exclusive. Therefore, both instruction 2 (1321) and instruction 3 (1322) cannot execute simultaneously. Therefore, the execution of the first portion (e.g. half) of threads (1311) for instruction 3 (1322) is stalled until processor cycle six (1335). Therefore, in the fifth processor cycle (1334) the second portion (e.g. half) of threads (1310) for instruction 2 (1321) are executed.

In the sixth processor cycle the first portion (e.g. half) of threads (1311) for instruction 3 (1322) are executed.

In the seventh processor cycle the second portion (e.g. half) of threads (1312) for instruction 3 (1322) are executed.

Figure 14:
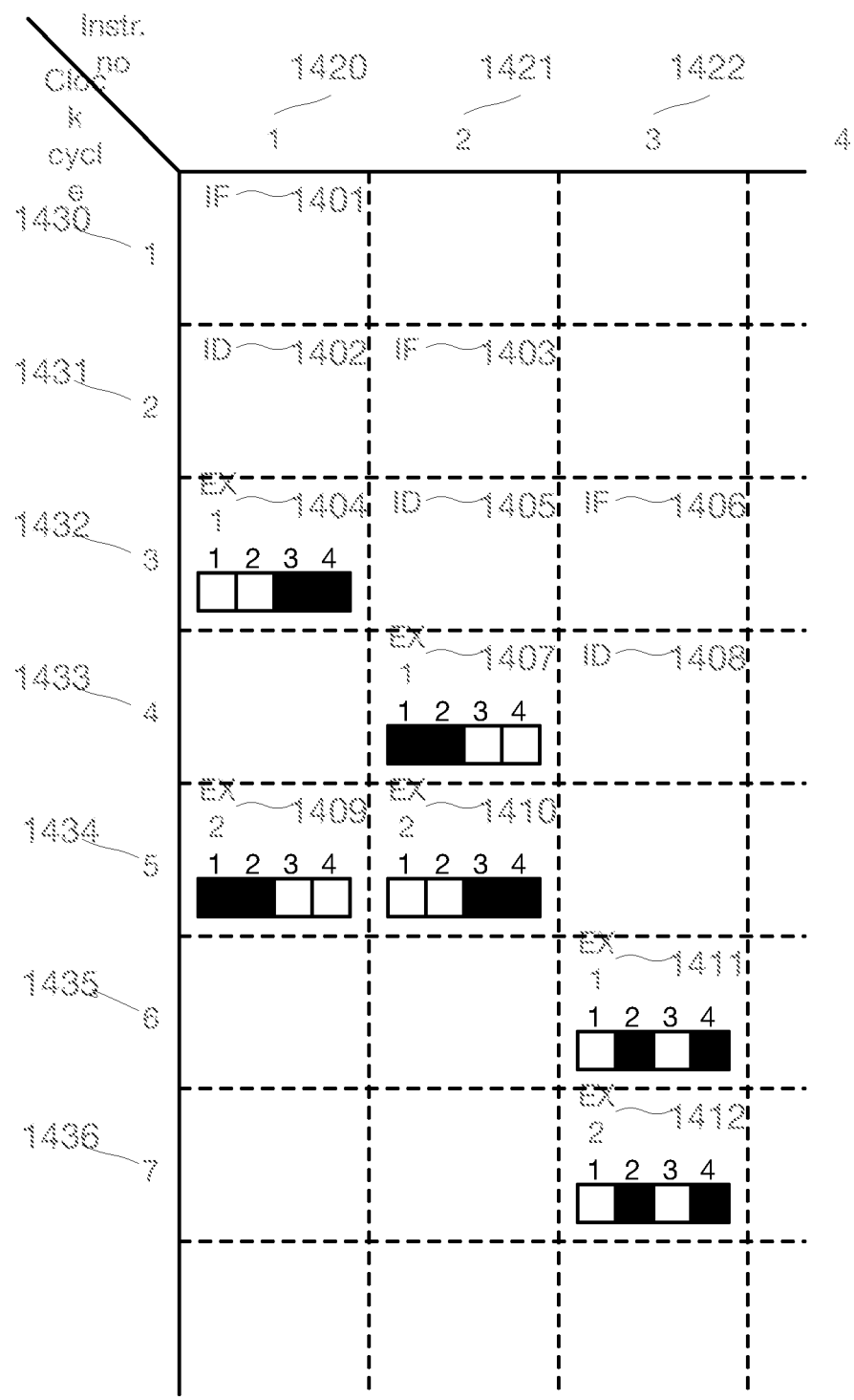
FIG. 14 shows an instruction pipeline sequence for a deep warp arrangement in accordance with an embodiment.

FIG. 14 shows an instruction pipeline sequence for a deep warp arrangement in accordance with an embodiment. In the arrangement there is a single instruction fetch unit, instruction decode unit and a execute unit.

Similar to the arrangement in FIG. 10, the embodiment has execution thread issuing circuit operable to determine whether active threads to be executed from a first thread group associated with a first operation, and active threads to be executed from a second thread group associated with a second operation, use mutually exclusive execution lanes of the plurality of execution lanes. The execution thread issuing circuit is also operable to determine if there is no resource contention if both the active threads to be executed from a first thread group, and active threads to be executed from a second thread group are executed substantially simultaneously, in a clock cycle. The first operation and second operation are associated with at least one instruction.

The execution thread issuing circuit 45, or the instruction execution processing circuit 47 determines whether the thread to be executed on each execution lane is from the first thread group or the second thread group. Whereby, if the thread for an execution lane is determined to be an active thread to be executed for the first thread group, the first operation is selected for execution for the execution lane, otherwise if the execution thread issuing circuit 45 determines the active thread to be executed for the execution lane is for the second thread group the second operation is selected for execution for the execution lane.

By providing this circuit, in some scenarios a plurality of instructions can be executed simultaneously, thereby increasing throughput, efficiency and reducing latency.

The embodiment shows that stalling processing of one of the instructions to minimise execution lane contention between the instructions can increase throughput and reduce latency.

In the first processor cycle (1430), instruction 1 (1420) instruction fetch (1401) is performed.

In the second processor cycle (1431), instruction 1 (1420) instruction decode (1402) and instruction 2 (1421) instruction fetch (1403) is performed.

In the third processor cycle (1432) the first portion (e.g. half) of threads (1404) of the thread group for instruction 1 (1420) are executed. Execution lanes 3 and 4 are active. Simultaneously, instruction 2 (1421) instruction decode (1405), and instruction 3 (1422) instruction fetch (1406) is performed.

In the example, the execution lanes used by the second portion (e.g. half) of threads (1409) for instruction 1 (1420) and first portion (e.g. half) of threads (1407) for instruction 2 (1421) are not mutually exclusive. Therefore, both instruction 1 (1420) and instruction 2 (1421) cannot execute simultaneously on a single execute unit.

Where there is a single instruction decode circuit operable to decode one instruction per processor cycle, and the plurality of instructions in the execution thread issuing circuit 45 are likely to comprise of divergent paths where the active threads to be executed for a first instruction and the active threads to be executed for a second instruction are likely to use different execution lanes, in an embodiment, the first instruction execution is stalled, so that the first and second instruction can be executed substantially simultaneously, in a clock cycle, in the instruction execution processing circuit 47. Therefore, in the fourth processor cycle the first portion (e.g. half) of threads (1407) of the thread group for instruction 2 (1421) are executed. Simultaneously, instruction 3 (1422), instruction decode (1408) is performed.

By stalling execution of instruction 1 (1420) by a clock cycle, in the example, the execution lanes used by the second portion (e.g. half) of threads (1409) of instruction 1 (1420) and second portion (e.g. half) of threads (1410) of instruction 2 (1421) are mutually exclusive. Therefore, both instructions can execute simultaneously on a single instruction execution processing circuit 47. Therefore, in the fifth processor cycle (1434) the second portion (e.g. half) of threads (1409, 1410) of the thread group for instruction 1 (1420) and instruction 2 (1421) are executed.

In the sixth processor cycle (1435) the first portion (e.g. half) of threads (1411) of the thread group for instruction 3 (1422) are executed.

In the seventh processor cycle (1436) the second portion (e.g. half) of threads (1412) of the thread group for instruction 3 (1422) are executed.

Figure 15:
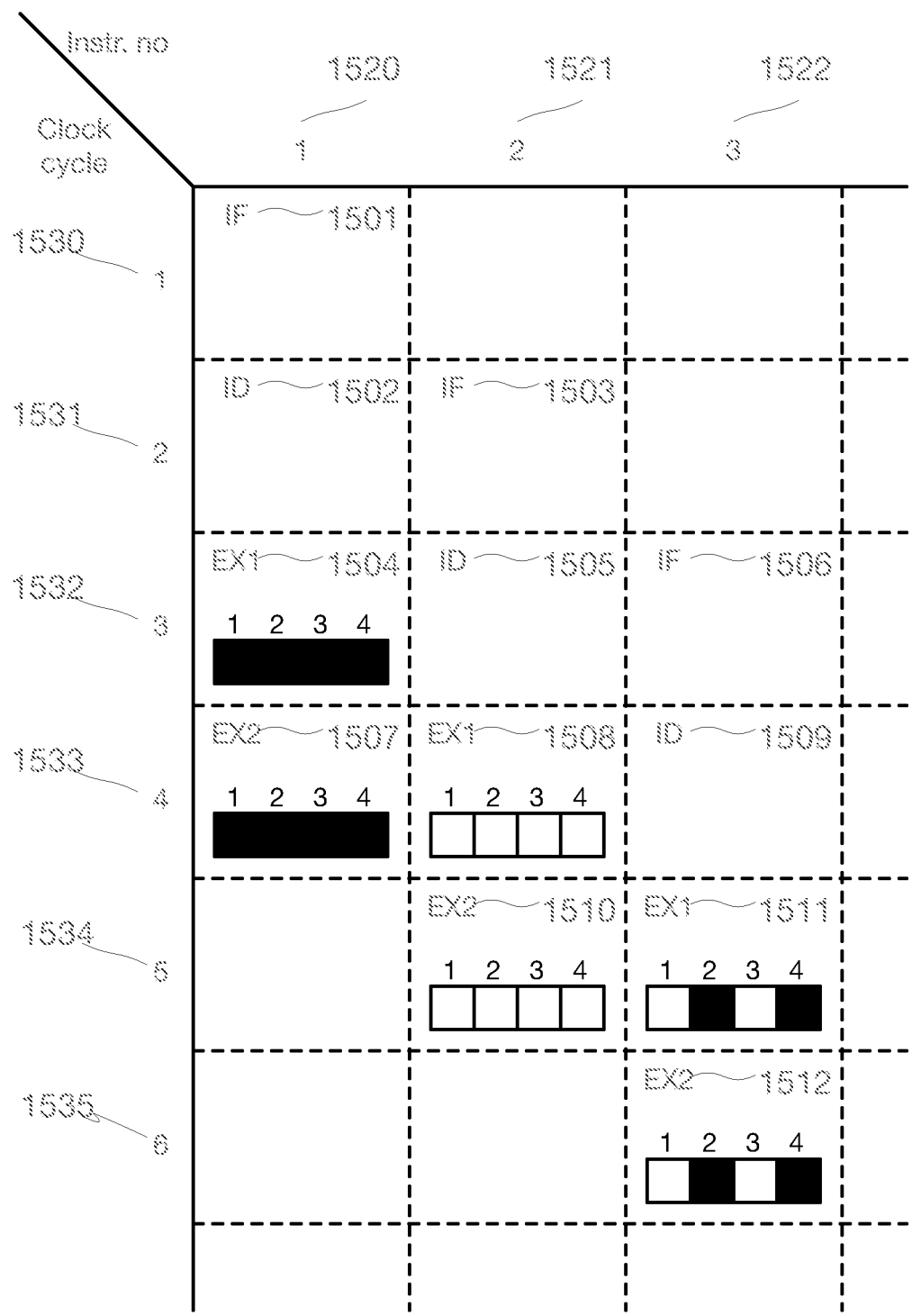
FIG. 15 shows an instruction pipeline sequence for a deep warp arrangement in accordance with an embodiment.

FIG. 15 shows an instruction pipeline sequence for a deep warp arrangement in accordance with an embodiment. In the arrangement there is a single instruction fetch unit, instruction decode unit and a execute unit.

Similar to the arrangement in FIG. 10, the embodiment has an execution thread issuing circuit operable to determine whether active threads to be executed from a first thread group associated with a first operation, and active threads to be executed from a second thread group associated with a second operation, use mutually exclusive execution lanes of the plurality of execution lanes. The execution thread issuing circuit is also operable to determine if there is no resource contention if both the active threads to be executed from a first thread group, and active threads to be executed from a second thread group are executed substantially simultaneously, in a clock cycle. The first operation and second operation are associated with at least one instruction.

The execution thread issuing circuit 45, or the instruction execution processing circuit 47 determines whether the thread to be executed on each execution lane is from the first thread group or the second thread group. Whereby, if the thread for an execution lane is determined to be an active thread to be executed for the first thread group, the first operation is selected for execution for the execution lane, otherwise if the execution thread issuing circuit 45 determines the active thread to be executed for the execution lane is for the second thread group the second operation is selected for execution for the execution lane.

By providing this circuit, in some scenarios a plurality of instructions can be executed simultaneously, thereby increasing throughput, efficiency and reducing latency.

The embodiment shows that by where there are no active threads to be executed in a thread group execution of active threads from another thread group can be performed.

In the first processor cycle (1530), instruction 1 (1520) instruction fetch (1501) is performed.

In the second processor cycle (1531), instruction 1 (1520) instruction decode (1502) and instruction 2 (1521) instruction fetch (1503) is performed.

In the third processor cycle (1532) the first portion (e.g. half) of threads (1504) of the thread group for instruction 1 (1520) are executed. Execution lanes 1, 2, 3 and 4 are active. Simultaneously, instruction 2 (1521) instruction decode (1505) and instruction 3 (1522) instruction fetch (1506) is performed.

In the example, the execution lanes used by the second portion (e.g. half) of threads (1507) for instruction 1 (1520) and first portion (e.g. half) of threads (1508) for instruction 2 (1521) are mutually exclusive. Indeed, in this example, there are no active threads in instruction 2 (1521). Therefore, both instruction 1 (1520) and instruction 2 (1521) can execute simultaneously on an instruction execution processing circuit 47. In some examples, instruction 2 would be skipped, and would not be executed. Therefore, in the fourth clock cycle (1533) the second portion (e.g. half) of threads (1507) of the threads group for instruction 1 (1520), and first portion (e.g. half) of threads (1508) of the thread group for instruction 2 (1521) are executed. Simultaneously, instruction 3 (1522), instruction decode (1509) is performed.

In the example, the execution lanes used by the second portion (e.g. half) (1510) of threads for instruction 2 (1521) and first portion (e.g. half) of threads (1511) for instruction 3 (1522) are mutually exclusive. Indeed, in this example, there are no active threads in instruction 2 (1521). Therefore, both instruction 2 (1521) and instruction 3 (1522) can execute simultaneously on a instruction execution processing circuit. Therefore, in the fifth processor cycle (1534) the second portion (e.g. half) of threads (1510) of the thread group for instruction 2 (1521) and the first portion (e.g. half) of the threads (1511) for thread group 1 for instruction 3 (1522) are executed.

In the sixth processor cycle (1535) the second portion (e.g. half) of threads (1512) of the thread group for instruction 3 (1522) are executed.

Figure 16:
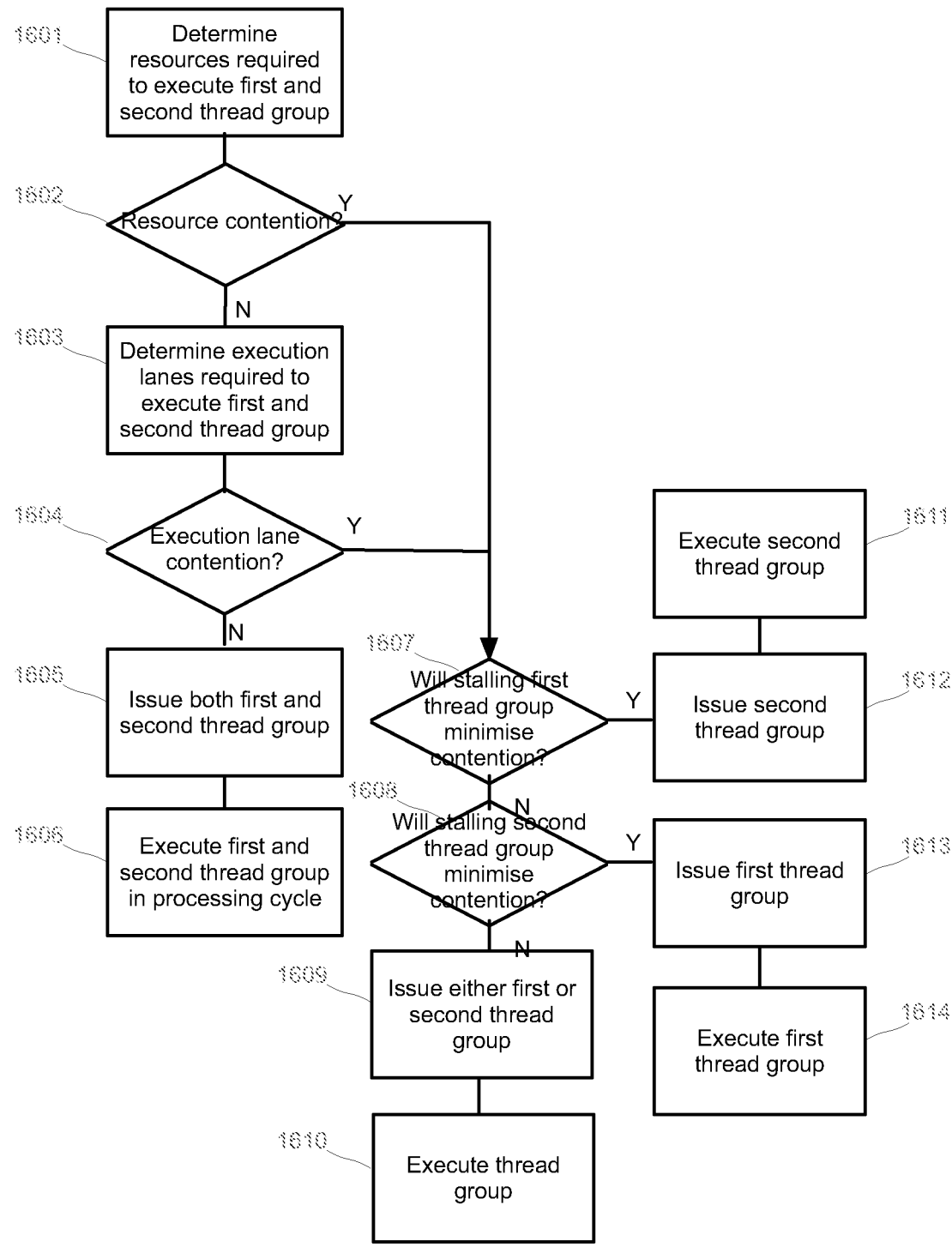
FIG. 16 shows schematically a process for executing execution threads in an embodiment of the technology described herein.

FIG. 16 schematically illustrates a process for executing execution threads in an embodiment of the technology described herein. In the present embodiment, a thread group (warp) includes plural threads.

The instruction fetch circuit, not shown, fetches an instruction and provides the fetched instruction to the instruction decode circuit, also not shown. The instruction decode circuit, not shown, decodes the fetched instruction. The instruction decode circuit provides the decoded instruction to the execution thread issuing circuit. An instruction indicates at least one operation to be performed. An operation operates on a thread group. The instruction decode circuit may provide at least one, (a plurality of), instruction to be issued by the execution thread issuing circuit 45.

As shown in FIG. 16, the process beings at step 1601, where the execution thread issuing circuit 45 analyses the operations and the associated thread groups to be executed. The execution thread issuing circuit 45 determines the resources required to execute the active threads of a first thread group to perform a first operation and the resources required to execute the active threads of a second thread group to perform a second operation. At step 1602, the execution thread issuing circuit 45 determines based on the resources required for the active threads to be executed of a first thread group and the active threads to be executed of a second thread group if there is resource contention. If there is no resource contention, the process moves on to step 1603.

In step 1603, the execution thread issuing circuit 45 analyses the instructions and the associated thread groups to be executed. The execution thread issuing circuit 45 determines the execution lanes required to execute the active threads to be executed of a first thread group to perform a first operation and the active threads to be executed of a second thread group to perform a second operation. At step 1604, the execution thread issuing circuit 45 determines whether the active threads to be executed of a first thread group and the active threads to be executed of a second thread group use different execution lanes if both the active threads to be executed of a first thread group and the active threads to be executed of a second thread group are both issued for execution and executed by the instruction execution processing circuit 47. If there is no execution lane contention, the process moves on to step 1605.

In step 1605 both the active threads to be executed of a first and the active threads to be executed of a second thread group are issued for execution by the execution thread issuing circuit 45. At step 1606, both the active threads to be executed of a first group and the active threads to be executed of a second thread group are executed by the instruction execution processing circuit 47. The entire process for FIG. 16 may then be repeated for the next active thread to be executed for the first and second thread groups.

If at step 1602 it is determined that there is a resource contention, or step 1604 it is determined that there an execution lane contention, the process, proceeds to step 1607.

At step 1607 the execution thread issuing circuit 45 determines whether stalling the active thread to be executed of the first thread group will minimise resource or execution lanes contention in subsequent clock cycles. If stalling the active thread to be executed of the first thread group will minimise resource or execution lane contention, step 1612 is performed. At step 1612 the active thread to be executed of the second thread group is issued by the execution thread issuing circuit 45. At step 1611 the active thread to be executed of the second thread group is executed by the instruction execution processing circuit 47. The entire process for FIG. 16 may then be repeated for the next active thread to be executed for the first and second thread groups.

If at step 1607 it is determined that stalling the active thread to be executed of the first thread group will not minimise resource or execution lane contention, step 1608 is performed. At step 1608 the execution thread issuing circuit 45 determines whether stalling the active thread to be executed of the second thread group will minimise resource or execution lanes contention in subsequent clock cycles. If stalling the active thread to be executed of the second thread group will minimise resource or execution lane contention, step 1613 is performed. At step 1613 the active thread to be executed of the first thread group is issued by the execution thread issuing circuit 45. At step 1614 the active thread to be executed of the first thread group is executed by the instruction execution processing circuit 47. The entire process for FIG. 16 may then be repeated for the next active thread to be executed for the first and second thread groups.

If at step 1608 it is determined that stalling the active thread to be executed of the second thread group will not minimise resource or execution lane contention, step 1609 is performed. At step 1609 the execution thread issuing circuit 45 issues either the active thread to be executed of the first thread group or the active thread to be executed of the second thread group. At step 1610 the instruction execution processing circuit 47 executes the active thread to be executed of the thread group selected in step 1609. The entire process for FIG. 16 may then be repeated for the next active thread to be executed for the first and second thread groups.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the technology described herein have been described in detail herein with reference to the accompanying drawings, it is to be understood that the technology described herein is not limited to those precise embodiments, and that various changes, additions and modifications can be affected therein by one skilled in the art without departing from the scope and spirit of the technology described herein as defined by the appended claims. For example, various combinations of the features of the dependent claims could be made with the features of the independent claims without departing from the scope of the technology described herein.

The invention claimed is:

1. A method of operating a data processor in which execution threads may execute program instructions to perform data processing operations, and in which execution threads may be grouped together into thread groups in which the plural execution threads of a thread group can each execute a set of instructions in lockstep;

the data processor comprising:
an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups to the plurality of execution lanes of the instruction execution processing circuit for execution;

the method comprising:

determining, using the execution thread issuing circuit, whether active threads to be executed of a first thread group to perform a first operation and active threads to be executed of a second thread group to perform a second operation use different execution lanes of the plurality of execution lanes of the instruction execution processing circuit for execution in a processing cycle; and issuing active threads from both first and second thread groups for execution across the different execution lanes in the processing cycle when the active threads to be executed of the first thread group and active threads to be executed of the second thread group use different execution lanes of the plurality of execution lanes of the instruction execution processing circuit for execution.

2. A method of claim 1, wherein:

when the active threads to be executed of the first thread group and the active threads to be executed of the second thread group use different execution lanes of the plurality of execution lanes of the instruction execution processing circuit for execution, the execution thread issuing circuit issuing the active threads to be executed of the first thread group- and the active threads to be executed of the second thread group to the plurality of execution lanes of the instruction execution processing circuit for execution, where a first subset of execution lanes perform the first operation on the active threads to be executed of the first thread group and a second subset of execution lanes perform the second operation on the second active threads to be executed of the second thread group, and wherein, if the active threads to be executed of the first thread group and active threads to be executed of the second thread group use at least one of the same execution lanes of the plurality of execution lanes of the instruction execution processing circuit for execution, the execution thread issuing circuit issuing circuit issuing either the active threads to be executed of the first thread group or the active threads to be executed of the second thread group to the plurality of execution lanes of the instruction execution processing circuit for execution.

3. The method of claim 1, wherein the total number of threads in the first thread group and second thread group is larger than the number of execution lanes in the instruction execution processing circuit.

4. The method of claim 1, further comprising determining, using the execution thread issuing circuit, whether execution of active threads to be executed of a first thread group and active threads to be executed of the second thread group will result in resource contention of the instruction execution processing circuit, wherein, when there is no resource contention of the instruction execution processing circuit, issuing, using the execution thread issuing circuit, the active threads to be executed of the first thread group and active threads to be executed of the second thread group simultaneously to the plurality of execution lanes of the instruction execution processing circuit for execution, wherein, when there is resource contention of the instruction execution processing circuit, the execution thread issuing circuit issuing circuit issuing either active threads to be executed of the first thread group or active threads to be executed of the second thread group to the plurality of execution lanes of the instruction execution processing circuit for execution.

5. The method of claim 1, further comprising issuing, using the execution thread issuing circuit, two or more execution threads of the same thread group to the same execution lane of the plurality of execution lanes of the instruction execution processing circuit for execution.

6. The method of claim 1, further comprising determining when there are no active threads to be executed in the first thread group, the at least a portion of the first thread group is not issued to the plurality of executions lanes of the instruction execution processing circuit for execution.

7. The method of claim 1, further comprising stalling, using the execution thread issuing circuit, execution of the active threads to be executed of the first thread group so that the active threads to be executed of the first thread group and active threads to be executed of the second thread group use different execution lanes of the plurality of execution lanes of the instruction execution processing circuit for execution.

8. The method of claim 1, wherein a first instruction is associated with the first thread group, and a second instruction is associated with the second thread group, wherein the first instruction is different to the second instruction.

9. The method of claim 1, wherein a first instruction is associated with the first operation, and a second instruction is associated with the second operation, wherein the first instruction is different to the second instruction.

10. The method of claim 8, wherein the data processor further comprises:

an instruction fetch circuit operable to fetch instructions from a memory; and an instruction decode circuit operable to decode instructions fetched by the instruction fetch circuit, the instruction decode circuit operable to decode one instruction from either the first instruction or the second instruction in one processing cycle.

11. The method of claim 8, further comprising stalling, using the execution thread issuing circuit, execution of the first instruction so that the active threads to be executed of the first thread group and the active threads to be executed of the second thread group use different execution lanes of the plurality of execution lanes of the instruction execution processing circuit for execution.

12. The method of claim 8, wherein the second instruction sequentially follows the first instruction in the sequence of the program.

13. The method of claim 8, wherein the first instruction and second instruction are from divergent instruction sequence.

14. The method of claim 13, wherein the divergent instruction sequence is due to the data processor executing an earlier conditional branch or indirect branch instruction.

15. The method of claim 8, wherein the first instruction and second instructions are predicated instructions, the first instruction associated with a first predicate, and the second instruction associated with a second predicate, wherein the first predicate is different to the second predicate.

16. The method of claim 1, wherein a first instruction is associated with the first thread group and the second thread group, and the first instruction is associated with the first operation and second operation, and the first instruction is associated with a first predicate and a second predicate, wherein the first predicate is different to the second predicate, the method further comprising:

determining the execution of the active threads of the first thread group by a first predicate associated with the first instruction, and determining the execution of the active threads of the second thread group by a second predicate associated with the first instruction.

17. A data processor in which execution threads may execute program instructions to perform data processing operations, and in which execution threads may be grouped together into thread groups in which the plural execution threads of a thread group can each execute a set of instructions in lockstep;

the data processor comprising:

an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups to the plurality of execution lanes of the instruction execution processing circuit for execution;

wherein the execution thread issuing circuit is configured to determine whether active threads to be executed of a first thread group to perform a first operation and active threads to be executed of a second thread group to perform a second operation use different execution lanes of the plurality of execution lanes of the instruction execution processing circuit for execution in a processing cycle; and the execution thread issuing circuit is configured to issue active threads from both first and second thread groups for execution across the different execution lanes in the processing cycle when the active threads to be executed of the first thread group and active threads to be executed of the second thread group use different execution lanes of the plurality of execution lanes of the instruction execution processing circuit for execution.

18. A non-transitory computer readable storage medium storing software code which when executing on a data processor performs a method of operating a data processor in which execution threads may execute program instructions to perform data processing operations on data values, and in which execution threads may be grouped together into thread groups in which the plural execution threads of a thread group can each execute a set of instructions in lockstep;

the data processor comprising:

an instruction execution processing circuit operable to execute instructions to perform processing operations for execution threads executing a program, wherein the instruction execution processing circuit is configured as a plurality of execution lanes, each execution lane being operable to perform processing operations for an execution thread of a thread group; and an execution thread issuing circuit operable to issue execution threads of thread groups the plurality of execution lanes of the instruction execution processing circuit for execution;

the method comprising:

determining, using the execution thread issuing circuit, whether active threads to be executed of a first thread group to perform a first operation and active threads to be executed of a second thread group to perform a second operation use different execution lanes of the plurality of execution lanes of the instruction execution processing circuit for execution in a processing cycle; and the execution thread issuing circuit is configured to issue active threads from both first and second thread groups for execution across the different execution lanes in the processing cycle when the active threads to be executed of the first thread group and active threads to be executed of the second thread group use different execution lanes of the plurality of execution lanes of the instruction execution processing circuit for execution.

* * * * *